(12) United States Patent
Gonzalez

(10) Patent No.: US 12,284,312 B2
(45) Date of Patent: Apr. 22, 2025

(54) USER-BASED CHAOS SYSTEM

(71) Applicant: RAKUTEN MOBILE, INC., Tokyo (JP)

(72) Inventor: Marco Gonzalez, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 606 days.

(21) Appl. No.: 17/585,554

(22) Filed: Jan. 27, 2022

(65) Prior Publication Data
US 2022/0345568 A1 Oct. 27, 2022

Related U.S. Application Data

(60) Provisional application No. 63/178,505, filed on Apr. 22, 2021.

(51) Int. Cl.
*H04M 3/24* (2006.01)
*G06F 11/34* (2006.01)
*G06F 11/36* (2006.01)
*G06N 7/08* (2006.01)

(52) U.S. Cl.
CPC ......... *H04M 3/242* (2013.01); *G06F 11/3447* (2013.01); *G06F 11/3664* (2013.01); *G06N 7/08* (2013.01)

(58) Field of Classification Search
CPC .......................... H04M 3/242; G06F 11/3447; G06F 11/3664; G06N 7/08
USPC ................................................... 717/131–135
See application file for complete search history.

(56) References Cited

U.S. PATENT DOCUMENTS

| | | | |
|---|---|---|---|
| 8,291,387 B2 * | 10/2012 | Pal | G06F 11/3457 703/22 |
| 10,684,940 B1 | 6/2020 | Kayal et al. | |
| 10,795,793 B1 * | 10/2020 | Arunachalam | G06F 11/0709 |
| 11,455,238 B2 * | 9/2022 | Zhang | G06F 11/3688 |
| 11,500,762 B2 * | 11/2022 | Hamid | G06F 11/3664 |
| 11,722,360 B2 * | 8/2023 | Di Martino | H04L 43/50 |

OTHER PUBLICATIONS

Peisenieks, "Chaos Testing our Mobile Apps at FullContact", 2016, retrieved from https://www.fullcontact.com/blog/2016/12/30/chaos-testing-our-mobile-apps-at-fullcontact/, 5 pages. (Year: 2016).*
Basiri et al., "Automating chaos experiments in production", 2019, arXiv, pp. 1-10. (Year: 2019).*

* cited by examiner

*Primary Examiner* — Ted T. Vo
(74) *Attorney, Agent, or Firm* — HAUPTMAN HAM, LLP

(57) ABSTRACT

A method includes receiving, from a mobile device, a request in a telecommunications system to invoke operations from an automation platform executed by processing circuitry to perform one or more of: executing, by the processing circuitry, one or more existing simulated failure experiments for the telecommunications system; determining, by the processing circuitry, whether a simulated failure blueprint is configured for specific simulated failure cases exist on the automation platform; determining, by the processing circuitry, whether a simulated failure template is configured to accept a targeted telecommunications domain and failure parameters exist on the automation platform; or instructing the mobile device to display recommended simulated failure experiments with selectable telecommunications domains and selectable failure parameters.

20 Claims, 13 Drawing Sheets

USER-BASED CHAOS SYSTEM

PRIORITY CLAIM AND CROSS-REFERENCE

This application claims priority to Provisional Application No. 63/178,505, filed Apr. 22, 2021, which is hereby incorporated by reference in its entirety.

BACKGROUND

Telecommunication is the transmission of information by various types of technologies, such as wire, radio, optical, or electromagnetic systems. Telecommunication allows for communication, almost instantaneously, over small and large distances. The transmission media for telecommunications has evolved through numerous stages of technology, from beacons and other visual signals to electrical cable and electromagnetic radiation (e.g., radio, microwave transmission, optical fiber, and communications satellites). Such transmission paths are often divided into communication channels that afford the advantages of multiplexing multiple concurrent communication sessions.

Chaos engineering is a discipline of experimenting (e.g., testing) on a system in production in order to build confidence in the system's capability to withstand turbulent and unexpected conditions. In development, resiliency is a given system's ability to tolerate failures while still ensuring adequate quality of service. Resiliency is good for system-user satisfaction. However, system development teams often do not meet the resiliency standard due to factors such as short deadlines or lack of knowledge of the field (e.g., a new and emerging technological field). Chaos engineering is a technique to improve resilience in a system. Chaos engineering is used to achieve resilience against infrastructure failures, network failures, and application failures.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features are arbitrarily increased or reduced for clarity of discussion.

DETAILED DESCRIPTION

Figure 1:
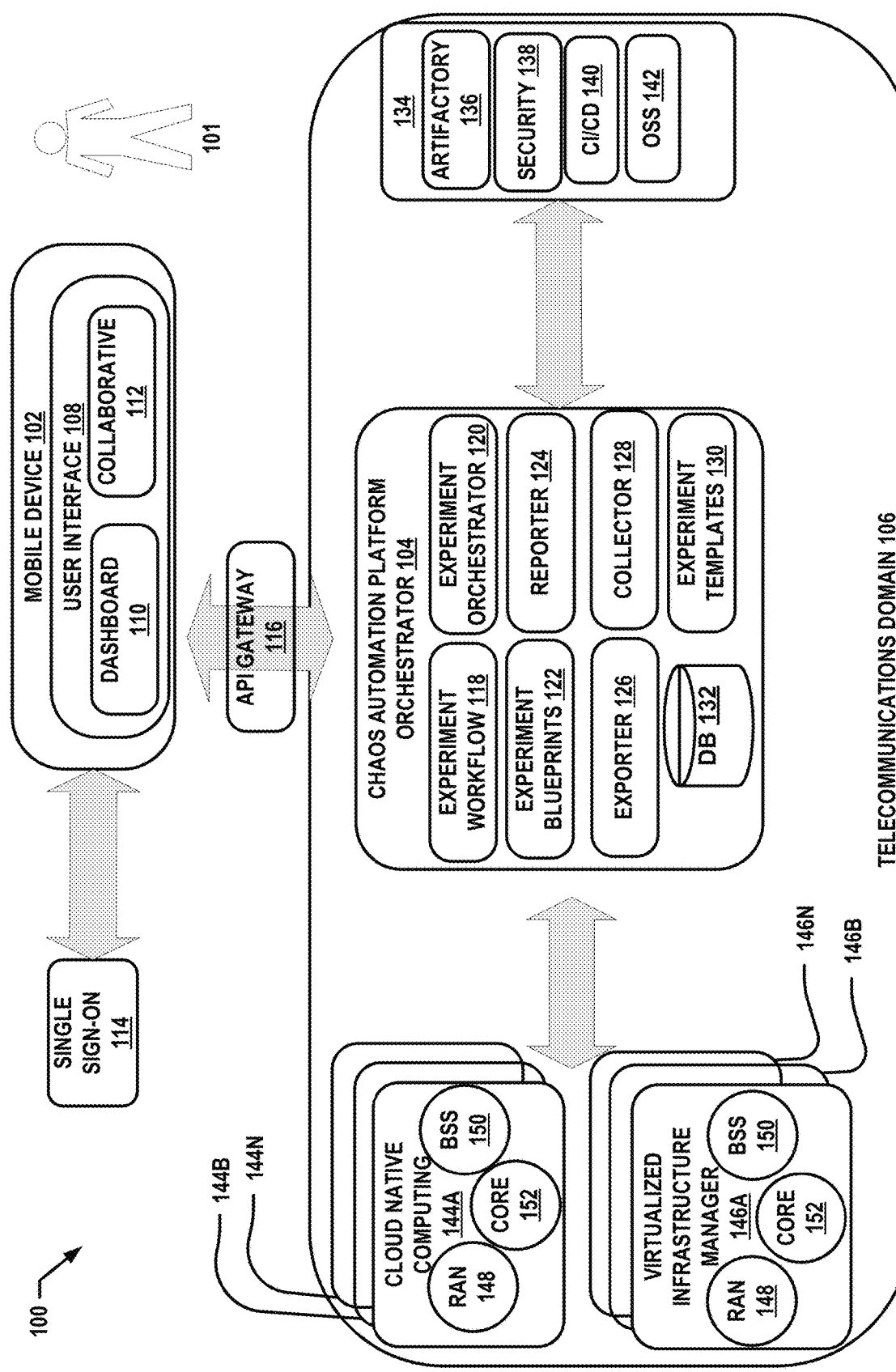
FIG. 1 is a diagrammatic representation of a cloud-native telecommunications system (TS), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors used herein likewise be interpreted accordingly.

In some embodiments, a zero-touch chaos automation platform orchestrator (CAPO) is implemented in existing, legacy, or newly emerging telecommunications systems (TS). Additionally or alternatively, the CAPO allows TS users to experiment and test the TS's reliability, resiliency, and recovery for existing and developing TS or information technology (IT) based systems. In some embodiments, the CAPO implements user-selected, specialized, user-created, generic chaos experiments (CEs) or the like. Additionally or alternatively, the CEs are created, generated, executed and the results evaluated based on existing TS databases, expertise and knowledge. In some embodiments, the CAPO is implemented in a fully cloud native TS.

In some embodiments, zero-touch refers to artificial intelligence (AI) and automation preempting user needs and issue resolution. Additionally or alternatively, CAPO uses data from user interaction and user behavior to predict the user's needs.

In some embodiments, an automation platform is a set of tools and resources with low-software or no-software interfaces that make automation of processes and workflows easy for users. Additionally or alternatively, the automation platform has wide functionality, such as automating processes to use machine learning for intelligent decision making.

In some embodiments, an orchestrator is referred to in the context of a service-oriented architecture, virtualization, provisioning, converged infrastructure and dynamic datacenter. Additionally or alternatively, the orchestrator aligns a user's request with the applications, data, and infrastructure. In some embodiments, in the context of cloud computing, orchestration includes a workflow module that provides a directed action towards objectives.

In some embodiments, cloud native computing is a software development approach to processing that uses cloud computing to build and run scalable applications in dynamic environments such as public, private, and hybrid clouds. Additionally or alternatively, technologies such as containers, micro-services, server-less functions and immutable infrastructure (e.g., servers or virtual machines that are never modified after deployment), deployed via declarative software (e.g., a style of building the structure and elements of computer programs that expresses the logic of a computation without describing its control flow) are elements of this architectural style. In some embodiments, these techniques enable loosely coupled systems that are resilient, manageable, and observable. Combined with automation, they allow engineers to make changes frequently and predictably with minimal effort. In some embodiments, cloud-native applications are built as a set of micro-services that run in Docker containers, and may be orchestrated in Kubernetes (K8S) and managed and deployed using development operations (DevOps) and Git (i.e., software for tracking changes in any file) continuous integration (CI) workflows. In some embodiments, Docker containers allow for the ability to package all software needed into one executable package. Additionally or alternatively, the container executes in a virtualized environment that isolates the contained application from its environment.

In some embodiments, cloud native computing is a growing technology. Additionally or alternatively, a very small percentage of telecommunications providers (e.g., approximately 6%) implement cloud native telecommunications solutions and thus there is not a significant amount of expertise on the cloud native telecommunications systems. Other approaches perceive cloud native telecommunications as not providing high availability, resilience, reliability, and recovery-enabled solutions. The perception is due to a lack of technical knowledge or appropriate environments to simulate conditions for experimenting and testing. Thus, other approaches avoid cloud native computing due to its uncertainty of resiliency and availability.

In some embodiments, CAPO provides one-click chaos engineering workflows to a TS. Additionally or alternatively, the CAPO provides this one-click chaos engineering workflow to a cloud native TS. In some embodiments, CAPO provides a compact and modular chaos design to accommodate any user-use experiment or test. Additionally or alternatively, CAPO provides a user-friendly interface allowing a user to develop, select, execute, and monitor chaos engineering experiments. In some embodiments, CAPO has a scalable architecture based on open-source components. Additionally or alternatively, CAPO provides for continuous integration/continuous delivery (CI/CD) that allows engineers to make frequent and predictable changes, based on the chaos engineering experiments, with minimal effort through the cloud native design.

Other approaches do not provide for a TS-oriented chaos experimentation platform performed and tested by users of the TS. Other approaches do not provide for open-source chaos experimentation TS applications. Other approaches do not provide for inter-vendor (e.g., inter-domain) CEs. Further, other approaches do not provide for multiple cloud infrastructure compliance for CEs. In some embodiments, CAPO provides TS oriented chaos experimentation, inter-vendor CEs, and multiple cloud infrastructure compliance.

In some embodiments, CAPO provides a chaos knowledge database (DB) to be applied for user-requested chaos experiments. Additionally or alternatively, the CAPO chaos knowledge DB contains information obtained over years of experience in a cloud native TS. In some embodiments, the CAPO database is a repository of cloud native TS solutions archived over years of cloud native TS operation.

In some embodiments, CAPO provides for telecommunications programmatic interfaces, such as network configuration protocol (NETCONF) that provides mechanisms to install, manipulate, and delete the configuration of network devices. Additionally or alternatively, CAPO provides for telecommunications applications and inter-vendor compatibility. In some embodiments, CAPO provides chaos engineering for cloud native architectures supporting TS and telecommunications applications. Additionally or alternatively, CAPO provides chaos engineering for security domains and telecommunications certifications expiration. In some embodiments, CAPO provides chaos engineering for a multi-cluster K8S environment (e.g., network and security).

FIG. 1 is a diagrammatic representation of a cloud native telecommunications system 100, in accordance with some embodiments.

Figure 12:
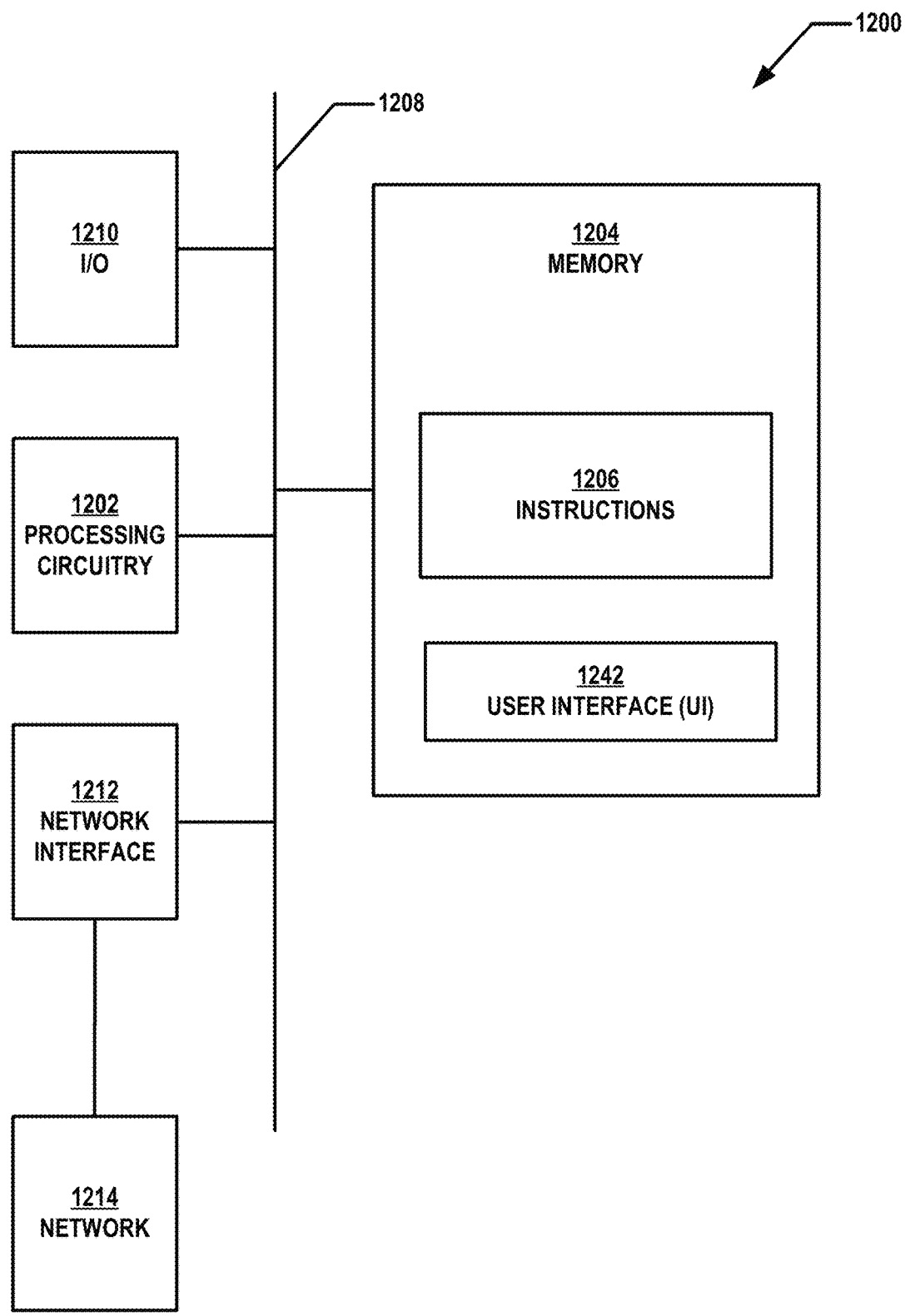
FIG. 12 is a high-level functional block diagram of a processor-based system, in accordance with some embodiments.

In some embodiments, a cloud native TS 100 includes processing circuitry (1202 FIG. 12) and memory (1204 FIG. 12) connected to processing circuitry 1202, where memory 1204 is configured to store executable instructions (1206 FIG. 12). When executed by processing circuitry 1202, executable instructions 1206 facilitate performance of operations, such as, receiving from a mobile device 102 in a telecommunications domain 106 an instruction to invoke simulated failure experiments from an automation platform 104 executed by processing circuitry 1202. Operations also include receiving from mobile device 102 a selected simulated failure experiment based on one or more of a telecommunications domain 106 and system parameters. Operations also include, executing, by processing circuitry 1202, the selected simulated failure experiment for telecommunications domain 106 configured to test software in telecommunications domain 106 with the system parameters.

In some embodiments, mobile device 102 is a computer or computing system. Additionally or alternatively, mobile device 102 has a liquid crystal display (LCD), light-emitting diode (LED) or organic light-emitting diode (OLED) screen interface, such as user interface 108, providing a touchscreen interface with digital buttons and keyboard or physical buttons along with a physical keyboard. In some embodiments, mobile devices connect to the Internet and interconnect with other devices. Additionally or alternatively, mobile device 102 incorporates integrated cameras, the ability to place and receive voice and video telephone calls, video games, and Global Positioning System (GPS) capabilities. Additionally or alternatively, mobile devices run operating systems (OS) that allow third-party apps specialized for capabilities to be installed and run. In some embodiments, mobile device 102 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, user interface (UI) 108 (e.g., human-machine interface) is the part of mobile device 102 that handles human-machine interaction. Additionally or alternatively, UI 108 is a membrane switch, rubber keypad or touchscreen. In some embodiments, UIs are composed of one or more layers, including a human-machine interface (HMI) that interfaces machines with physical input hardware such as keyboards, mice, or game pads, and output hardware such as computer monitors, speakers, and printers. In some embodiments, UI 108 is a graphical user interface (GUI), which is composed of a tactile UI and a visual UI capable of displaying graphics. Additionally or alternatively, sound is added to the GUI for a multimedia user interface (MUI).

In some embodiments, dashboard 110 is a type of GUI that provides views relevant to a particular objective or process. Additionally or alternatively, dashboard is another name for a visualized progress report or report and considered a form of data visualization. In some embodiments, dashboard 110 is a strategic, analytical, operational, or informational dashboard. In some embodiments, dashboard 110 allows user 101 to monitor CAPO 104. Additionally or alternatively, dashboard 110 measures performance and forecasts. In some embodiments, dashboard 110 provides analytical context, comparisons, and history, along with performance evaluators. In some embodiments, user 101 interacts with the CAPO data, such as drilling down into the underlying details. Additionally or alternatively, dashboard 110 is accessible by a web browser and linked to regularly updating data sources. In some embodiments, collaborative element 112 allows users, entities, or organizations to work together to create, run and evaluate chaos experimenting on CAPO 104.

In some embodiments, mobile device 102 allows user 101 to log on through a single sign on (SSO) 114. Additionally or alternatively, SSO 114 is a security tool that allows access to multiple software components using a single credential. In some embodiments, SSO 114 is an authentication scheme that allows user 101 to log in with a single ID and password to any of several related, yet independent, software systems. Additionally or alternatively, SSO 114 allows user 101 to log in once and access services without re-entering authentication factors. In some embodiments, a single sign-off or single log-out (SLO) is incorporated and allows user 101 to log off by a single action of signing out; terminating access to multiple software systems.

In some embodiments, once user 101 is verified through SSO 114, mobile device 102 uses an application programming interface (API) gateway 116 to communicate with telecommunications domain 106. Additionally or alternatively, API gateway 116 is a management tool that allows interaction between user 101 and a collection of backend services at telecommunications domain 106. In some embodiments, API gateway 116 is one or more servers that act as an API front-end, receive API requests, enforce throttling and security policies, passes requests to back-end services and then passes the response back to user 101. Additionally or alternatively, API gateway 116 also provides functionality such as collecting analytics data and providing caching. In some embodiments, API gateway 116 provides functionality to support authentication, authorization, security, audit and regulatory compliance.

In some embodiments, API gateway 116 allows user interaction with backend services on telecommunications domain 106. Additionally or alternatively, telecommunications domain 106 is a telecommunications network that has a collection of transmitters, receivers, and communications channels that send messages to one another. In some embodiments, telecommunications domain 106 includes digital communications networks that contain one or more routers that work together to transmit information to the correct user. In some embodiments, a telecommunications domain is an analog communications network that consists of one or more switches that establish a connection between two or more users. Additionally or alternatively, telecommunications domain 106 is a cloud native telecommunications domain that has been developed to run on servers hosted in a cloud environment.

In some embodiments, telecommunications domain 106 uses K8S as an open-source container-orchestration system for automating computer application deployment, scaling, and management. Additionally or alternatively, K8S provides a platform for automating deployment, scaling, and operations of application containers across clusters of hosts.

In some embodiments, domain refers to a network domain. Additionally or alternatively, a network domain is an administrative grouping of multiple private computer networks or hosts within the same infrastructure. In some embodiments, domain refers to a software domain. Additionally or alternatively, a software domain is the targeted subject area of a computer program. In some embodiments, domain refers to application domain. Additionally or alternatively, an application domain separates executed software applications from one another. In some embodiments, domain refers to a programming domain. Additionally or alternatively, a programming domain is computer software or multiple sets of software written for a specific domain.

In some embodiments, CAPO 104 is based on open-source components. Additionally or alternatively, open source is source code (software) that is made available for possible modification and redistribution. In some embodiments, open source products include permissions to use the source code, design documents, or content of the product. Additionally or alternatively, open source refers to the open-source model, in which open-source software or other products are released under an open-source license as part of the open-source-software movement. In some embodiments, CAPO 104 includes several modules or components, such as experiment workflow 118, experiment orchestrator 120, experiment blueprints 122, reporter 124, exporter 126, collector 128, experiment templates 130, and chaos knowledge database 132.

In some embodiments, experiment workflow module 118 uses an automation platform that allows user 101 to automate chaos experimenting processes and chaos experimenting workflows. Additionally or alternatively, experiment workflow module 118 is an open source module or solution. In some embodiments, workflow module 118 controls the workflow shown in FIGS. 2A, 2B, 3, 4, 5, & 6.

In some embodiments, experiment orchestrator module 120 aligns a user's request with other modules, chaos knowledge DB 132, and infrastructure 134. Additionally or alternatively, orchestrator module 120 aligns interaction between mobile device 102, telecommunications domain 106, SSO 114, infrastructure 134, and cloud native computing 144 and virtualized infrastructure manager 146.

In some embodiments, experiment blueprints module 122 assists user 101 in creating and saving a chaos experiment (CE) that is defined and re-experimented (tested) at any time on CAPO 104. Additionally or alternatively, experiment blueprints module 122 controls the operation of method 300 shown in FIG. 3.

In some embodiments, reporter module 124 creates reports that are displayed on dashboard 110 as well as being stored for reference and use by CAPO 104 at a later date or for use in another experiment. For example, progress reports, reports for data visualization, or reports for dashboard 110. Additionally or alternatively, reporter module controls call flow between user 101 and other modules. For example, the chaos reporter call flow shown in FIG. 8. In some embodiments, reporter module 124 collects CE results, retrieves data from executed CEs, sends CE results to user 101, and designates CE identification (ID).

In some embodiments, exporter module 126 provides for the automated or semi-automated input and output of data sets between different software applications or modules. Additionally or alternatively, exporter module 126 retrieves CE results from chaos knowledge DB 132 based on ID, exports CE data in a desired format, and confirms execution of the CE to user 101.

In some embodiments, collector module 128 gathers all experiment data from executed CEs. For example, collector module 128 gathers all experiment data from executed CEs, fetches and stores CE logs from chaos knowledge DB 132, stores CE operation and audit logs in chaos knowledge DB 132, and sends CE operation and audit logs to reporter module 124.

In some embodiments, experiment templates module 130 assists user 101 in creating a basic model, a template, from which each CE gets created. Additionally or alternatively, experiment templates module 130 executes method 500 for chaos template workflow at shown in FIG. 5.

In some embodiments, chaos knowledge DB 132 is one or more DBs or methods of storing digital data that contain data stored by telecommunications domain 106 in the telecommunications domain's existence. Additionally or alternatively, chaos knowledge DB 132 stores knowledge gathered over years of operation in cloud native TS 100. In some embodiments, chaos knowledge DB 132 stores operation and audit logs from CEs, retrieves CE results based on ID, and returns CE data when requested.

In some embodiments, CAPO 104 interacts with telecommunications infrastructure 134. Additionally or alternatively, infrastructure 134 contains artifactory 136 that is a software repository or a storage location for software packages. Additionally or alternatively, artifactory 136 allows for installing and updating of software packages. In some embodiments, artifactory 136 provides a package management system tool intended to search for, install and otherwise manipulate software packages from artifactory 136. Additionally or alternatively, artifactory 136 stores artifacts or mirrors external repositories which may be inaccessible due to security restrictions. In some embodiments, artifactory 136 provides additional functionality, like access control, versioning, security checks for uploaded software, cluster functionality etc.

In some embodiments, infrastructure 134 contains a security module 138 that protects telecommunications domain 106 and associated networks from information disclosure, theft of or damage to hardware, software, or electronic data, as well as from the disruption or misdirection of services.

In some embodiments, infrastructure 134 contains CI/CD 140 that provides continuous integration and deployment of the telecommunications domain's services and software based upon CAPO user-based CE results. For example, as experiments are completed, modifications to software, systems and even hardware is made, based on the experiment results, either automatically by CI/CD 140 or manually by engineers, to account for the failure scenario executed during the experiment.

In some embodiments, infrastructure 134 contains an operations support system (OSS) 142 that are computer systems used by telecommunications domain 106 to manage networks (e.g., telecommunications networks). Additionally or alternatively, OSS 142 supports management functions such as network inventory, service provisioning, network configuration and fault management. In some embodiments, OSS 142 is used to support various end-to-end telecommunication services, such as network management systems, service delivery, service fulfillment, including the network inventory, activation and provisioning, service assurance, and user care.

In some embodiments, CAPO 104 interacts with one or more cloud native computing clusters 144A, 144B through 144N (where N is any positive whole number, hereinafter referred to as cloud native computing clusters 144). Additionally or alternatively, cloud native computing (CNC) clusters 144 are referred to as native K8S clusters. In some embodiments, CNC clusters 144 are a set of computers that work together so that they are viewed as a single system. Additionally or alternatively, CNC clusters 144 provide a platform for automating deployment, scaling, and operations of application containers across clusters 144. In some embodiments, CNC clusters 144 work with a range of container tools and executes containers in a cluster 144, often with images built using Docker. In some embodiments, cloud native computing clusters 144 are K8S-based platforms or infrastructure on which K8S is deployed as a platform-providing service.

In some embodiments, a container refers to OS level virtualization systems and is sometimes used to refer to fuller virtual machine environments (e.g., virtualized infrastructure manager 146) operating in concert with a host OS. Additionally or alternatively, OS-level virtualization is an OS paradigm in which a kernel allows the existence of multiple isolated user space instances. In some embodiments, such instances are called containers (e.g., LXC, Solaris containers, Docker), Zones (Solaris containers), virtual private servers (OpenVZ), partitions, virtual environments (VEs), virtual kernels (DragonFly BSD), or jails (FreeBSD jail or chroot jail) and look like real computers from the point of view of programs operating in them. Additionally or alternatively, a computer program running on an ordinary OS sees all the resources (e.g., connected devices, files and folders, network shares, CPU power, quantifiable hardware capabilities) of that computer. However, programs running inside of a container only see the container's contents and devices assigned to the container.

In some embodiments, virtualized infrastructure manager (VIM) 146A, 146B through 146N (where N is a positive whole number, herein after referred to as VIM 146), is a network architecture that uses the technologies of IT virtualization to virtualize entire classes of network node functions into building blocks that connect, or chain together, to create communication services. In some embodiments, a VIM consists of one or more virtual machines or containers running different software and processes, on top of standard high-volume servers, switches and storage devices, or even cloud computing infrastructure, instead of having custom hardware appliances for each network function.

In some embodiments, each of CNC 144 and VIM 146 contains a radio access network (RAN) 148, business support services (BSS) 150 and a core network (CN) 152. Additionally or alternatively, RAN 148 provides access elements to allow radio access to user 101. In some embodiments, RAN 148 is part of a mobile TS. Additionally or alternatively, RAN 148 implements a radio access technology and resides in a device, such as mobile device 102 and with CN 150. In some embodiments, examples of RAN 148 types are GRAN (GSM RAN), GERAN (EDGE packet radio services), UTRAN (UMTS RAN) and E-UTRAN (Long Term Evolution (LTE) high speed and low latency RAN).

In some embodiments, BSS 150 are components that allow operations for user 101 or other end users. Additionally or alternatively, BSS 150 are components that a telecommunications service provider (such as telecommunications domain 106) uses to run its business operations for users, such as user 101. In some embodiments, together with OSS 142 various end-to-end telecommunication services are supported. Additionally or alternatively, BSS 150 and OSS 142 have their own data and service responsibilities.

In some embodiments, CN 152 is a part of a computer network which interconnects networks, providing a path for the exchange of information between different local area networks (LANs) or subnetworks. Additionally or alternatively, CN 152 ties together diverse networks. In some embodiments, CN 152 contains such elements as MME (e.g., the key control-node for the LTE access-network responsible for idle mode User Equipment (UE) paging and tagging procedure including retransmissions), SAEGW-C/U (e.g, a serving gateway that routes and forwards user data packets, while also acting as the mobility anchor for user 101 during handovers and as the anchor for mobility between LTE and other 3GPP technologies), HSS (e.g., home subscriber server is a central database that contains user-related and subscription-related information), or the like.

Figure 2A:
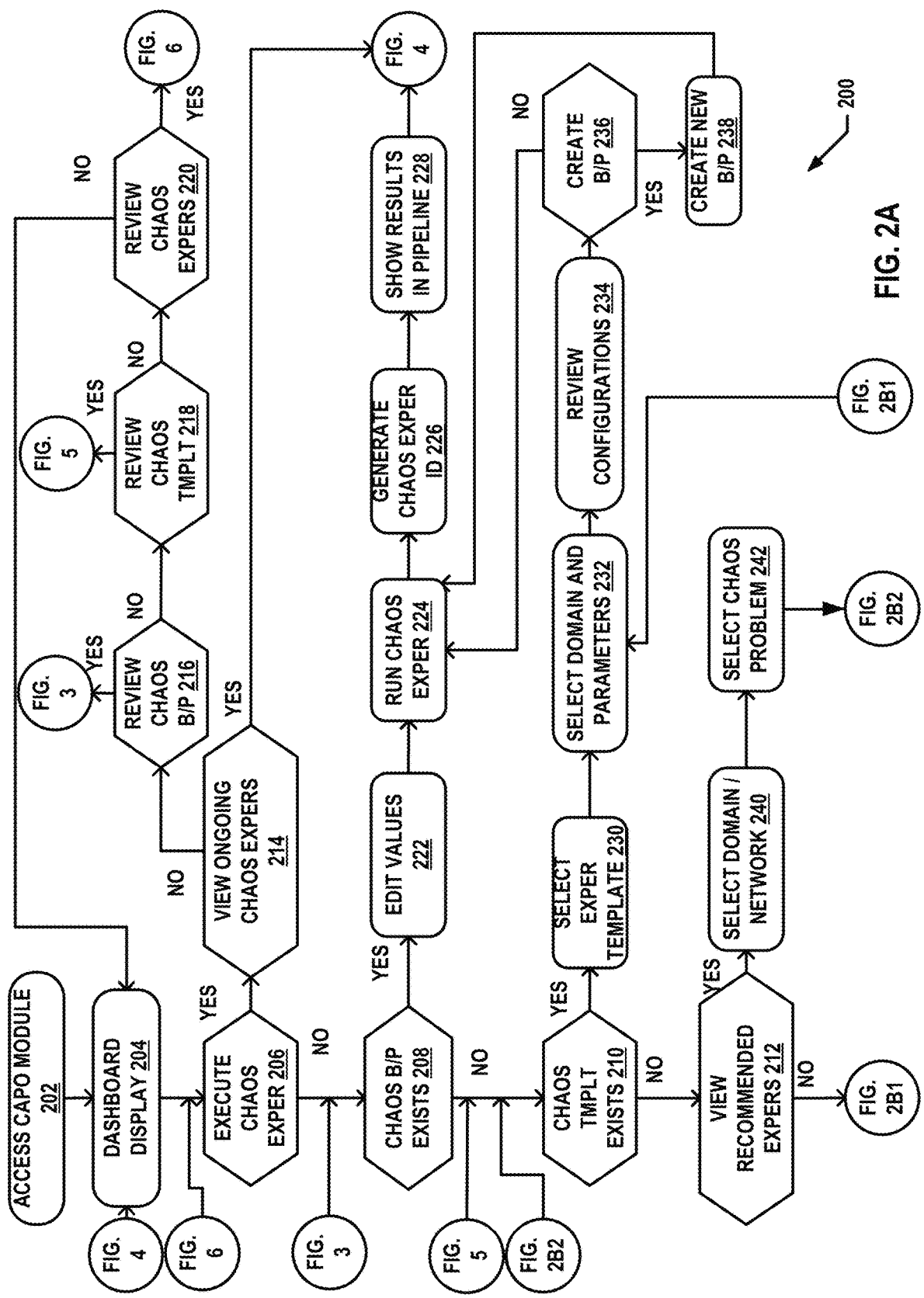
FIG. 2A is a flow diagram representation of a method for chaos automation platform orchestration, in accordance with some embodiments.

FIG. 2A is a flow diagram representation of a method for chaos automation platform orchestration, in accordance with some embodiments.

Figure 2B:
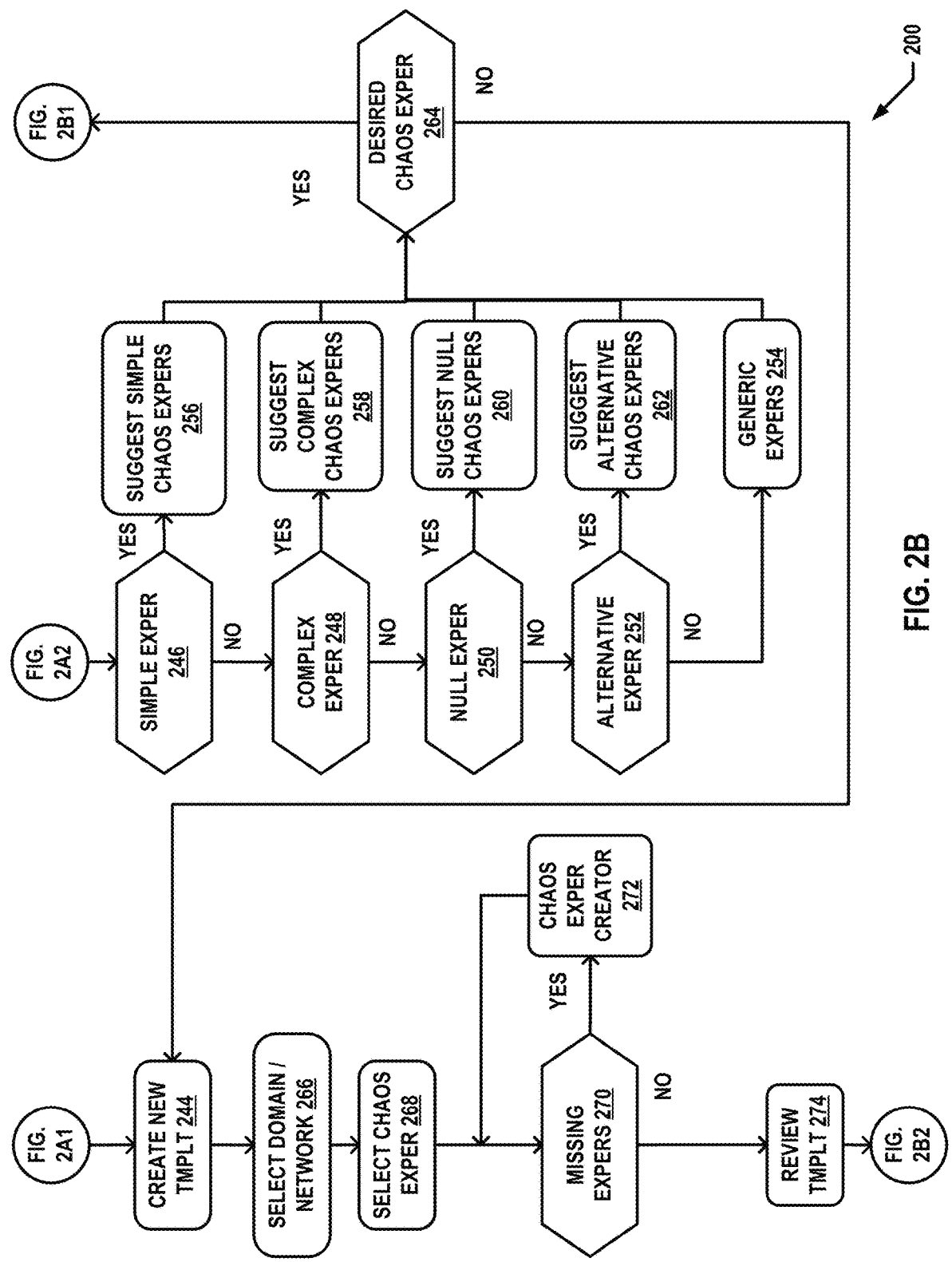
FIG. 2B is a flow diagram representation of a method for chaos automation platform orchestration, in accordance with some embodiments.

In some embodiments, additional operations are performed before, during, and/or after method 200 depicted in FIGS. 2A & 2B, and that some other processes are only briefly described herein. Method 200 is implementable, for example, using computing system 1200 (FIG. 12, discussed below), in accordance with some embodiments.

In FIG. 2A, method 200 includes blocks 202-242. At block 202, user 101 accesses CAPO module 104. In some embodiments, method 200 includes receiving, from mobile device 102, a request from user 100 in TS 100 to invoke operations from an automation platform executed by processing circuitry 1202 to perform one or more of: executing, by processing circuitry 1202, one or more existing simulated failure experiments for TS100 (block 206); determining, by processing circuitry 1202, whether a simulated failure blueprint is configured for specific simulated failure cases exist on automation platform 104 (block 208); determining, by processing circuitry 1202, whether a simulated failure template is configured to accept a targeted telecommunications domain and failure parameters exist on automation platform 104 (block 210); and instructing mobile device 102 to display recommended simulated failure experiments with selectable telecommunications domains and selectable failure parameters (block 212).

In some embodiments, experiment orchestrator 120 aligns a user's request with other modules within CAPO 104. As a non-limiting example, in the embodiments as shown in FIG. 1 user 101 accesses CAPO 104 using mobile device 102. Continuing the example, mobile device 102 accesses CAPO 104 using SSO 114 and API gateway 116. From block 202, flow proceeds to block 204.

At block 204, user 101 accesses a main default or customized dashboard 110. As a non-limiting example, user 101 accesses dashboard 110 using mobile device 102. Continuing the example, dashboard 110 presents user 101 with several options. For example, user 101 has the ability to choose to: execute CEs 206, choose a chaos blueprint 208, choose a chaos template 210, review recommended experiments 212, and create new chaos templates 244 (FIG. 2B). From block 204, flow proceeds to block 206.

At block 206, user 101 has an option to execute a CE. As a non-limiting example, user 101 selects to execute a CE ("YES" branch of block 206). In some embodiments, experiment blueprints module 122 assists user 101 in creating and saving a CE that is defined and re-experimented (tested) at any time on CAPO 104. Flow proceeds to block 214.

Figure 4:
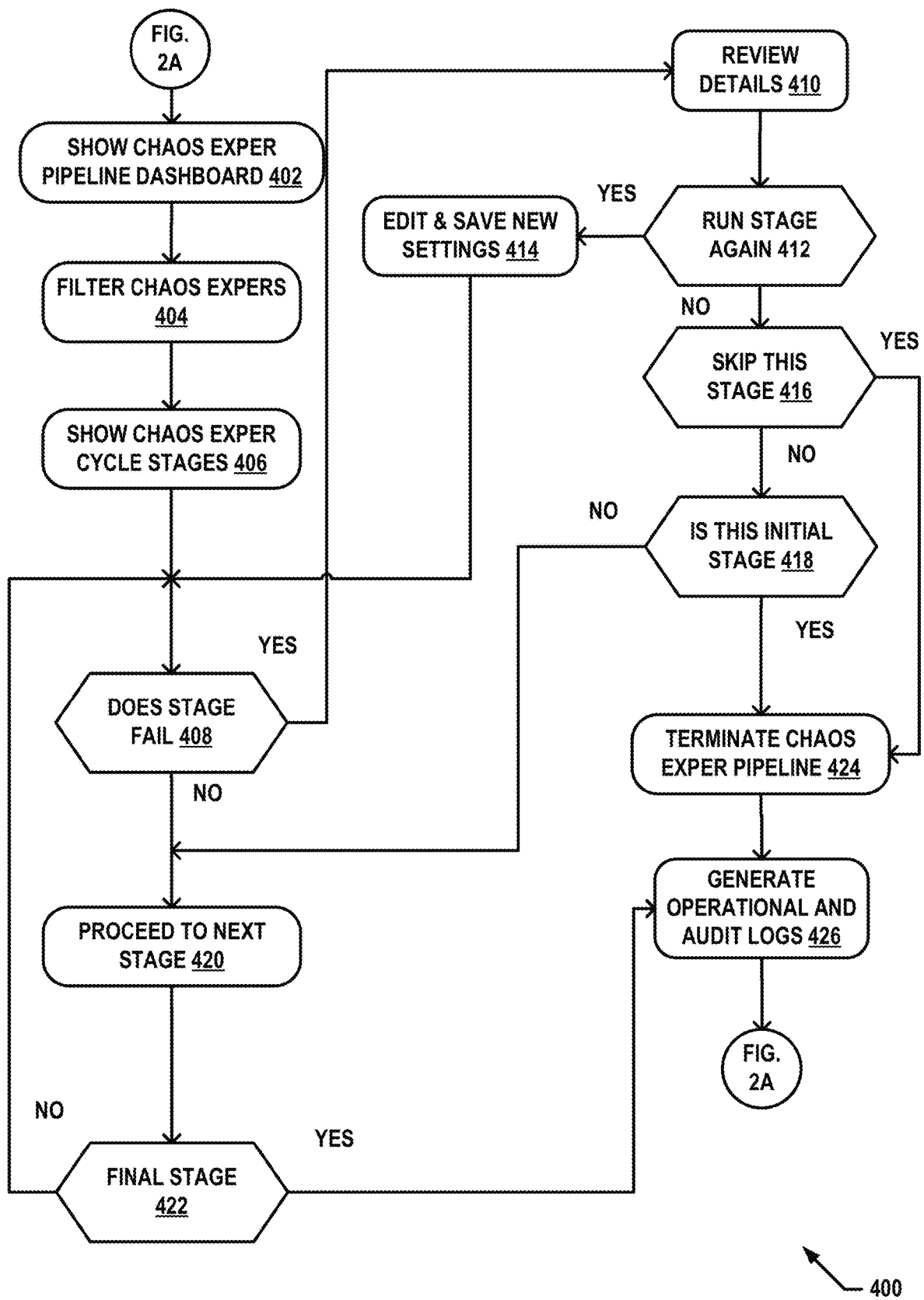
FIG. 4 is a flow diagram representation of a method of managing chaos pipeline workflow, in accordance with some embodiments.

At block 214, user 101 has an option to view ongoing CEs or review chaos blueprints 216. As a non-limiting example, user 101 selects, on display 110, to view ongoing CEs ("YES" branch of block 214) and is directed to chaos pipeline workflow 400 shown in FIG. 4. Flow proceeds to block 402 (FIG. 4). Continuing the example, user 101 selects, instead, to review chaos blueprints at block 216 ("NO" branch of block 214). Flow proceeds to block 216.

Figure 3:
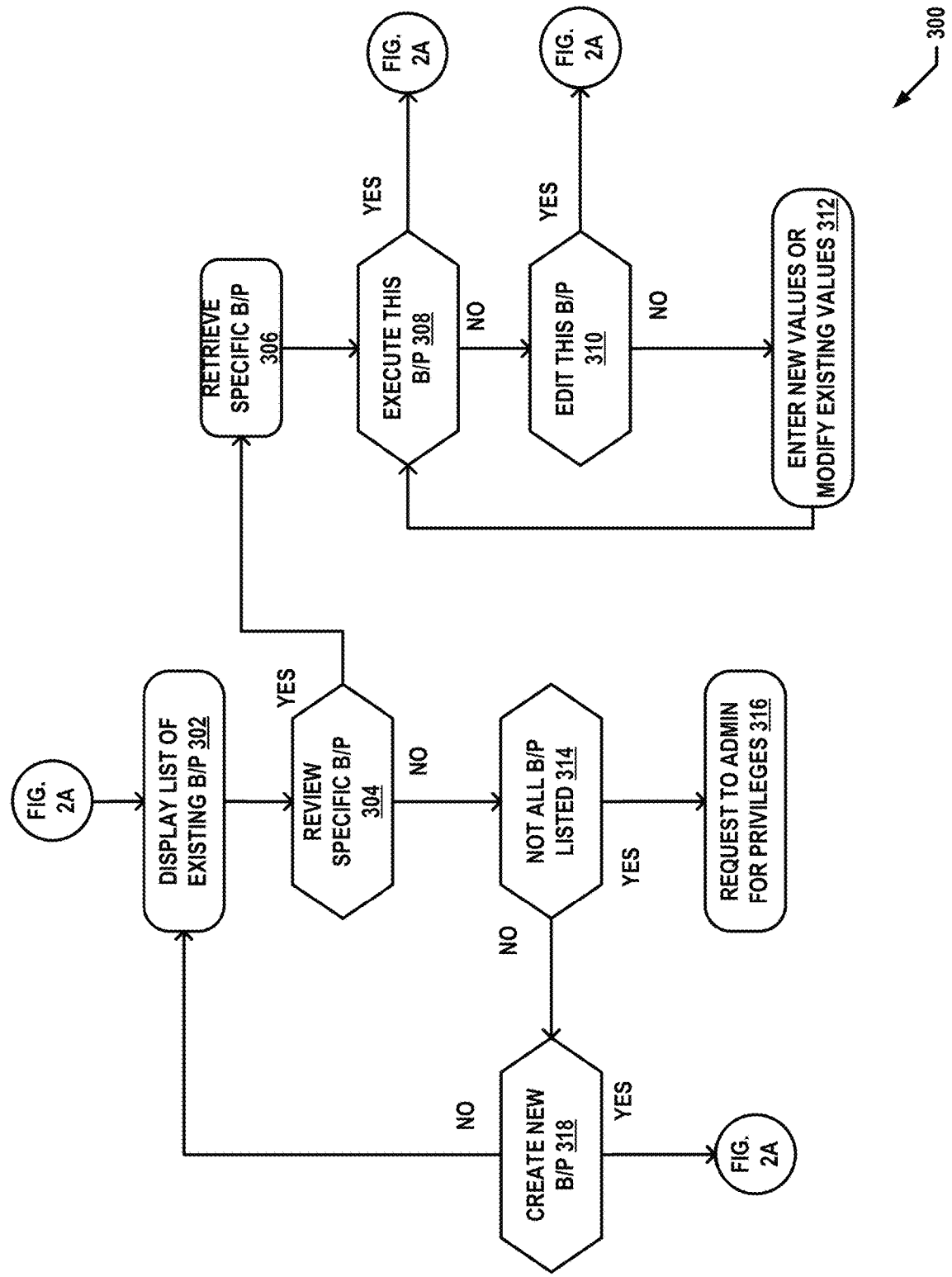
FIG. 3 is a flow diagram representation of a method of managing chaos blueprints, in accordance with some embodiments.

At block 216, user 101 has an option to review a saved CE that is selectable to be executed at any time. As a non-limiting example, user 101 selects, on display 110, to review chaos blueprints ("YES" branch of block 216) and is directed to chaos blueprint view workflow 300 shown in FIG. 3. Flow proceeds to block 302 (FIG. 3).

Figure 5:
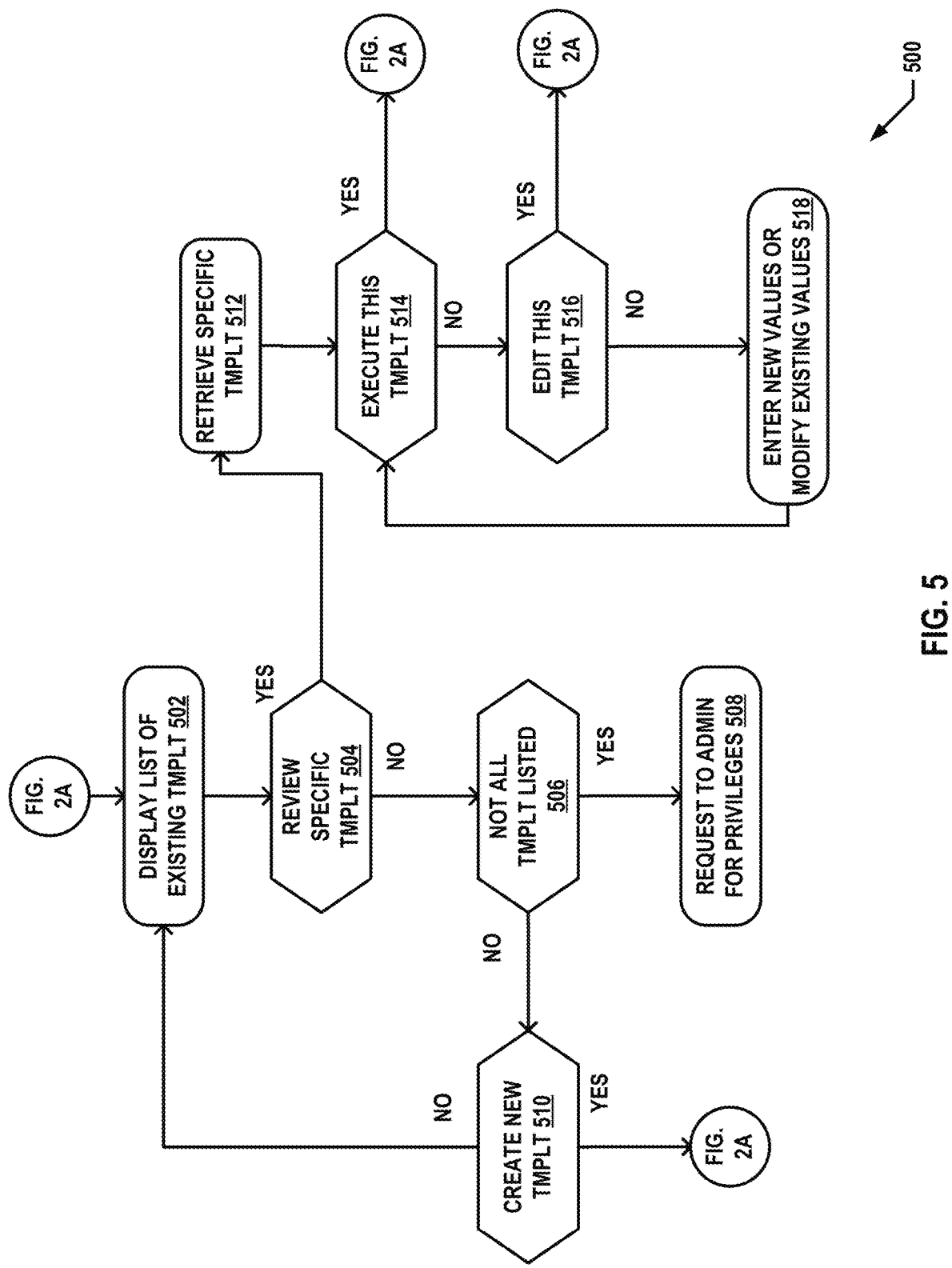
FIG. 5 is a flow diagram representation of a method of managing chaos templates, in accordance with some embodiments.
Figure 11:
FIG. 11 is a pictorial diagram representation of a chaos template creation display, in accordance with some embodiments.

Continuing the example of block 216, user 101, instead, chooses to review chaos templates at block 218 ("NO" branch of block 216). Flow proceeds to block 218. At block 218, user 101 has an option to review chaos templates. In some embodiments, a template is a basic model that each created CE derives. For example, template 1100 (FIG. 11). As a non-limiting example, user 101 chooses, on display 110, to review chaos templates ("YES" branch of block 218) and is directed to chaos template view workflow 500 shown in FIG. 5. Flow proceeds to block 502 (FIG. 5).

Figure 6:
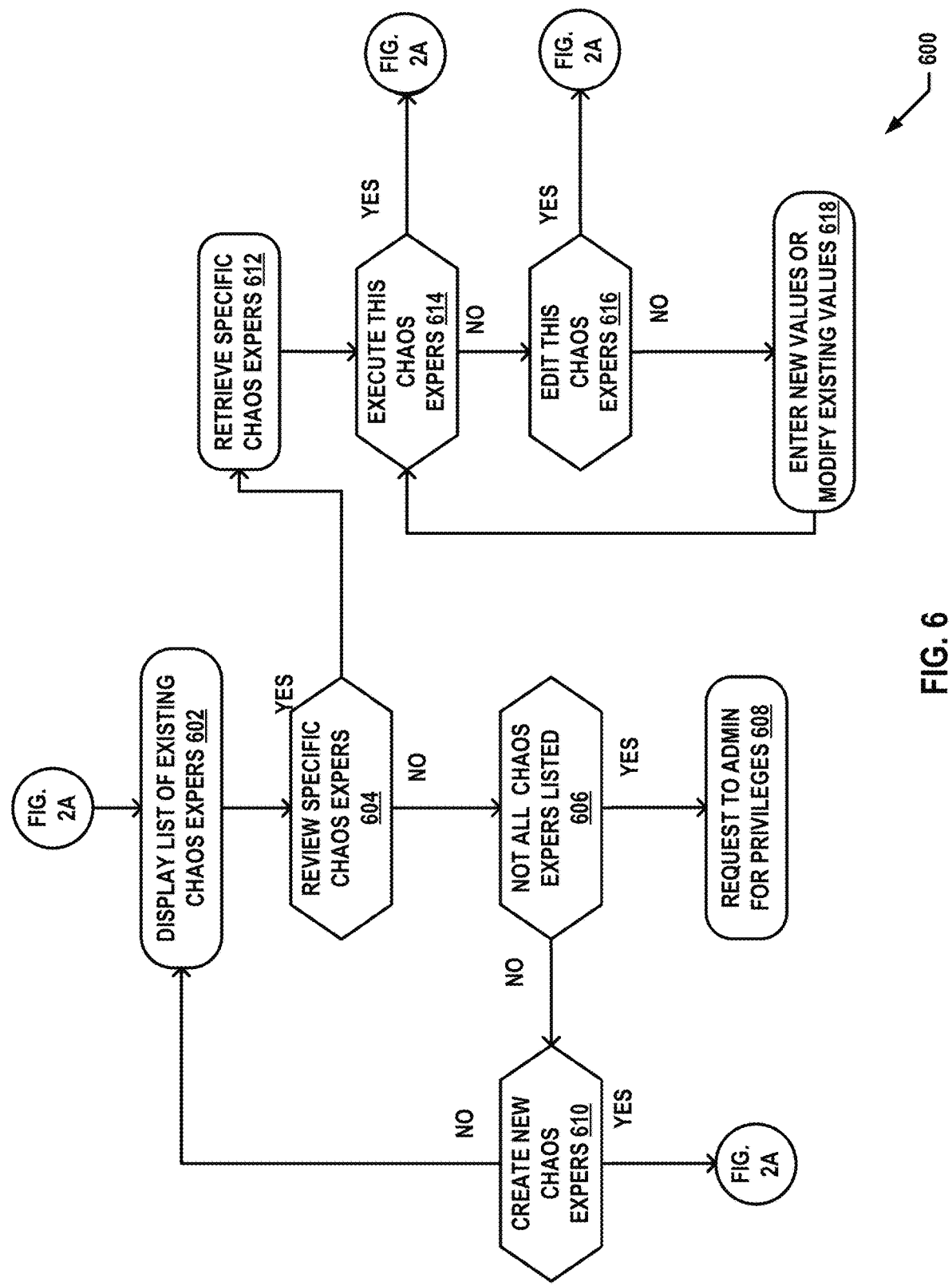
FIG. 6 is a flow diagram representation of a method of managing chaos individual experiments, in accordance with some embodiments.

Continuing the example of block 218, user 101 chooses, instead, to review existing CEs at block 220 ("NO" branch of block 218). Flow proceeds to block 220. At block 220, user 101 has an option to review existing CEs designed to test TS 100. As a non-limiting example, user 101 chooses, on display 110, to review existing CEs ("YES" branch of block 220) and is directed to chaos individual experiments workflow 600 shown in FIG. 6. Flow proceeds to block 602 (FIG. 6).

Continuing the example of block 220, user 101 selects, instead, not to review existing CEs ("NO" branch of block 220) and flow proceeds to block 204 and the main default customized dashboard display.

Continuing the example from block 206, user 101, selects not to execute a CE ("NO" branch of block 206) and instead chooses a chaos blueprint at block 208. Flow proceeds to block 208. At block 208, user 101 chooses, on display 110, to find an existing chaos blueprint ("YES" branch of block 208) and flow proceeds to block 222 where user 101 edits or confirms experiment values in the blueprint.

From block 222 where user 101 has the ability to edit and confirm set experiment values in a blueprint, flow proceeds to block 224 where user 101 executes a CE. From block 224, flow proceeds to block 226, where a CE identification (CID) is generated. From block 226 flow proceeds to block 228, where the results of the CE are shown in a chaos pipeline. From block 228 flow proceeds to block 402 (FIG. 4) and chaos pipeline workflow 400.

Figure 9:
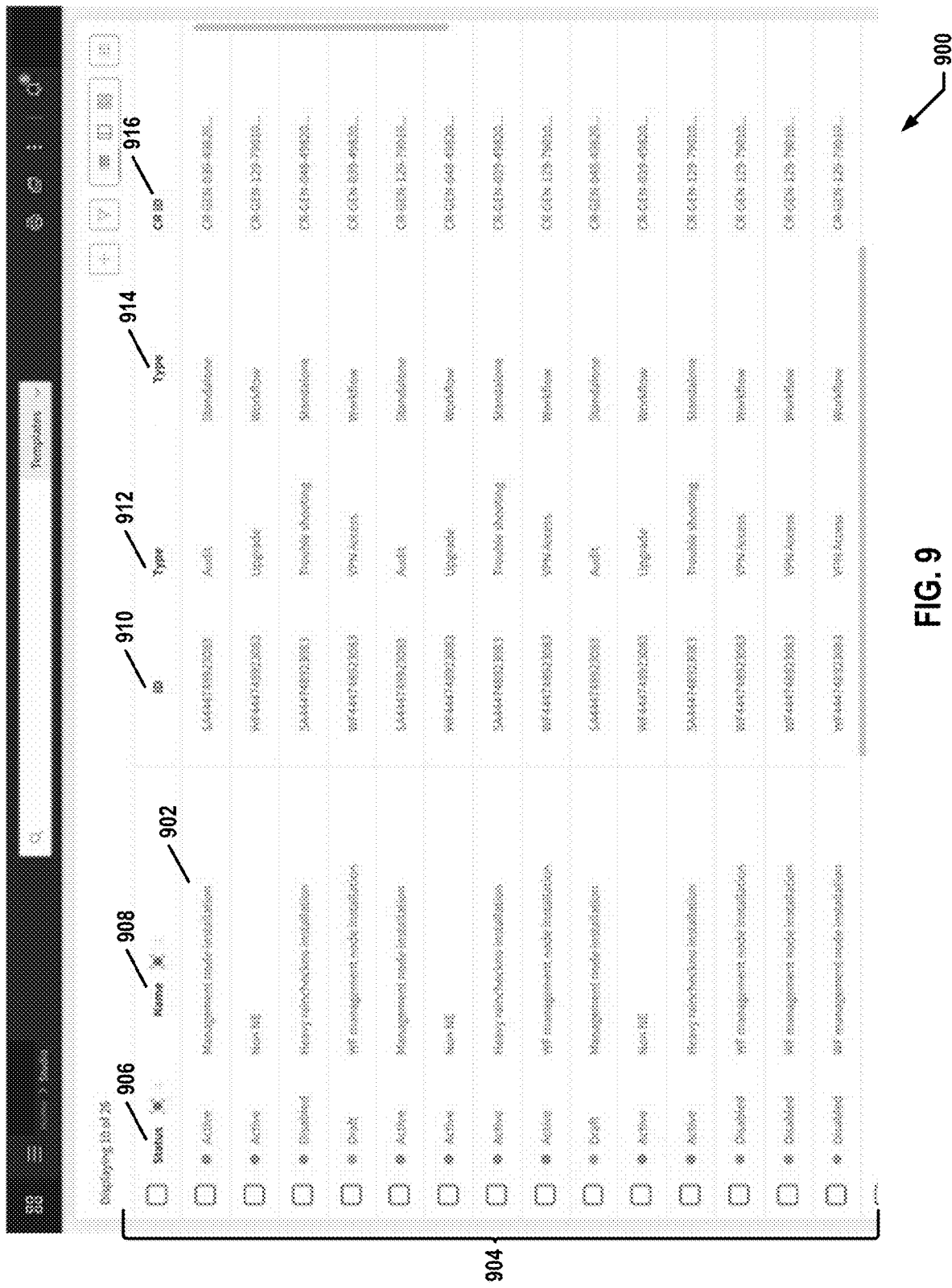
FIG. 9 is a pictorial diagram representation of a display showing chaos templates, in accordance with some embodiments.

Continuing the example of block 208, user 101 selects, instead, to find existing chaos templates ("NO" branch of block 208) and flow proceeds to block 210. At block 210, user 101 has an option to select an existing chaos template, such as existing template 902 (FIG. 9) shown in template display 900 (FIG. 9). As a non-limiting example, user 101 chooses, on display 110, an existing chaos template ("YES" branch of block 210) and flow proceeds to block 230 where user 101 selects a desired experiment template.

From block 230, flow proceeds to block 232 where user 101 selects and/or modifies target domain, basic parameters, or advanced parameters. For example, user 101 selects to modify target domains (1002 FIG. 10) or selects to modify elements, such as basic or advanced parameters, (1004 FIG. 10) on template display (1000 FIG. 10). From block 232, flow proceeds to block 234, where user 101 reviews a template configuration. From block 234 flow proceeds to block 236, where user 101 has an option to create a chaos experiment blueprint (CEB). User 101 has an option to create a new CEB ("YES" branch of block 236) and flow proceeds to block 238. At block 238, user 101 creates a new blueprint for a CE. After creation of the new CEB, flow proceeds to block 224 where user 101 executes the CE. When user 101 selects, instead, not to create a new blueprint ("NO" branch of block 236), but run a CE based on a selected chaos experiment template (CET), flow proceeds to block 224 and user 101 executes the CE.

Continuing the example of block 210, user 101 selects, instead, to view recommended CEs ("NO" branch of block 210) and flow proceeds to block 212. At block 212, user 101 has an option to view recommended CEs. As a non-limiting example, user 101 selects, on display 110, to select an existing CE ("YES" branch of block 212) and flow proceeds to block 240 where user 101 selects a desired domain or network where the CE will be simulated upon. From block 240, flow proceeds to block 242 where user 101 selects a chaos problem type. Flow proceeds to block 246 in FIG. 2B.

FIG. 2B is a flow diagram representation of a method for chaos automation platform orchestration 200, in accordance with some embodiments.

In FIG. 2B, method 200 includes blocks 246-274. At block 246, where user 101 is able to select a simple CE, to block 248 ("NO" branch of block 246), where user 101 is able to select a complex CE, to block 250 ("NO" branch of block 248), where user 101 is able to select a null (e.g., negligible) CE, to block 252 ("NO" branch of block 250), where user 101 is able to select an alternative CE. In a situation where user 101 has elected not to choose a simple, complex, null or alternative CE, ("NO" branch of block 252) flow proceeds to block 254 where user 101 is shown generic CEs to be chosen from.

From block 246, after user 101 selects a simple CE, flow proceeds to block 256 ("YES" branch of block 246) where user 101 is presented with recommended simple CEs. From block 248 after user 101 selects a complex CE, flow proceeds to block 258 ("YES" branch of block 248), where user 101 is presented with recommended complex CEs. From block 250 after user 101 selects a null CE flow proceeds to block 260 ("YES" branch of block 250), where user 101 is presented with CEs that are neither simple nor complex. From block 252, after user 101 selects an alternative CE flow proceeds to block 262 ("YES" branch of block 252), where user 101 is presented with alternative CEs to choose from. Flow proceeds from blocks 256, 258, 260, 262, and 254 to block 264 where user 101 decides whether a selected CE is the CE desired. In a situation where user 101 has found a desired CE, flow proceeds to block 232 (FIG. 2A) ("YES" branch of block 264) where user 101 is prompted to select a domain and parameters for the desired CE. In a situation where user 101 did not find a desired CE, flow proceeds to block 244 ("NO" branch of block 264) to create a new CE template.

Continuing the example from blocks 212 (FIG. 2A) and 264, user 101 selects, instead, to create a new chaos template 244 ("NO" branch of blocks 212 and 264) and flow proceeds to block 244 (FIG. 2B). From block 244, flow proceeds to block 266 where user 101 selects a target domain and/or network element for a CE. For example, user 101 selects to modify target domains (1002 FIG. 10) or selects to modify network elements (1004 FIG. 10) on template display (1000 FIG. 10). From block 266, flow proceeds to block 268, where user 101 selects a CE. From block 268 flow proceeds to block 270, where user 101 is queried whether they were able to find a CE user 101 desires to execute. In a situation where user 101 determines a desired CE is missing ("YES" branch of block 270), flow proceeds to at block 272 where user 101 is able to create a CE. Flow proceeds to block 274 ("NO" branch of block 270) where user 101 reviews the newly created chaos template. Flow proceeds to block 210 (FIG. 2A) where user 101 is able to choose the newly created chaos template.

FIG. 3 is a flow diagram representation of a method of managing chaos blueprints 300, in accordance with some embodiments.

In some embodiments, additional operations are performed before, during, and/or after method 300 depicted in FIG. 3, and that some other processes are only briefly described herein. Method 300 is implementable, for example, using computing system 1200 (FIG. 12, discussed below), in accordance with some embodiments.

In FIG. 3, method 300 includes blocks 302-318. At block 302, user 101 is presented with a display of all existing CEBs. Flow proceeds to block 304 where user 101 is able to select a specific CEB for review.

In a scenario where user 101 elects to review a specific CEB ("YES" branch of block 304), user 101 first retrieves a specific CEB at block 306. Flow proceeds to block 308 where user 101 is able to execute the specific CEB. If user 101 elects to execute the selected blueprint ("YES" branch of block 308), flow is directed to block 208 (FIG. 2A). If user 101 instead desires to edit the selected CEB ("NO" branch of block 308), user 101 is able to edit the blueprint ("YES" branch of block 310) and flow is directed to block 208 (FIG. 2A) where user 101 is able to edit values at block 222. If user 101 instead desires to enter new values or modify the currently existing values in the CEB ("NO" branch of block 310), user 101 is able to enter new values or modify existing values at block 312. Once completed with entering the new values or modifying the existing values, flow proceeds to block 308 where user 101 is able to execute the blueprint.

Continuing the example from block 304, when user 101 does not wish to review a specific CEB ("NO" branch of block 304), user 101 is able to inquire whether all CEBs are not listed at block 314. In a scenario where all CEBs are not listed ("YES" branch of block 314), user 101 is able to request from an administrator privileges to have the CEBs missing displayed (e.g., in a situation where user 101 does not have access to CEBs executed within a secure domain)

at block 316. In a scenario where all CEBs are listed ("NO" branch of block 314), user 101 is able to create a new CEB at block 318.

Continuing the example from block 318, in a scenario where user 101 wishes to create a new CEB ("YES" branch of block 318), flow proceeds to 208 (FIG. 2A). In a scenario where user 101 does not wish to create a new CEB ("NO" branch of block 318), flow proceeds back to block 302, where user 101 is again shown a display of existing CEBs.

FIG. 4 is a flow diagram representation of a method of managing chaos pipeline workflow 400, in accordance with some embodiments.

In some embodiments, additional operations are performed before, during, and/or after method 400 depicted in FIG. 4, and that some other processes are only briefly described herein. Method 400 is implementable, for example, using computing system 1200 (FIG. 12, discussed below), in accordance with some embodiments.

In FIG. 4, method 400 includes blocks 402-426. At block 402, user 101 is presented with a CE pipeline dashboard. Flow proceeds to block 404 where user 101 is able to filter the CE pipeline dashboard by ID, date, or requestor (e.g., user). Flow proceeds to block 406 where dashboard 110 displays CE lifecycle stages (e.g., each of the stages of a CE). Flow proceeds to block 408, where computing system 1200 determines if a stage of the CE failed.

In a scenario where a stage failed ("YES" branch of block 408), user 101 is able to review the details of the stage failure at block 410 and determine whether to run the stage again at block 412. In a scenario where user 101 elects to run the failed stage again ("YES" branch of block 412), flow proceeds to block 414 where user 101 is able to edit and save new settings (e.g., based upon the failure of the stage) and flow again returns to stage 408 where computing system 1200 determines whether the stage failed again or not.

Continuing on with the example of block 412, in a scenario where user 101 does not wish to run the failed stage again ("NO" branch of block 412), user 101 is able to elect to skip the failed stage at block 416. In a scenario where user 101 does not skip the failed stage ("NO" branch of block 416), computing system 1200 determines whether the failed stage is the initial stage at block 418. In a scenario, where computing system 1200 determines the failed stage is not the initial stage ("NO" branch of block 418), flow proceeds to block 420 and CE proceeds to the next stage. Block 420 is also the flow progression if a stage does not fail ("NO" branch of block 408).

Continuing on with the example of block 422, computing system 1200 determines whether the next stage is the final stage. In a scenario where the next stage is not the final stage ("NO" branch of block 422), flow proceeds to stage 408 to determine whether the next stage failed.

Continuing on with the example of block 416, in a scenario where user 101 elects to skip a failed stage ("YES" branch of block 416), flow proceeds to block 424 where the CE and CE pipeline is terminated. Further, a CE and CE pipeline is terminated when a CE initial stage fails ("YES" branch of block 418) and flow proceeds to block 424. In a scenario where an initial stage of a CE is causing a failure within TS 100 (e.g, simulated), then method 400 does not proceed past the initial stage, but instead flow proceeds to block 426 where operational and audit logs are generated. Block 426 is also the flow progression from block 422 when a CE has reached the final stage ("YES" branch of block 422). Flow progression continues to block 204 where user 101 is able to review the operational and audit logs. Further, the operation and audit logs are used to make software and/or any hardware adjustments based upon any failures discovered during the CE pipeline testing or experimenting.

FIG. 5 is a flow diagram representation of a method of managing chaos templates 500, in accordance with some embodiments.

In some embodiments, additional operations are performed before, during, and/or after method 500 depicted in FIG. 5, and that some other processes are only briefly described herein. Method 500 is implementable, for example, using computing system 1200 (FIG. 12, discussed below), in accordance with some embodiments.

In FIG. 5, method 500 includes blocks 502-518. At block 502, user 101 is presented with a display of existing CETs. Flow progresses to block 504 where user 101 is able to review a specific CET. In a scenario where user 101 does not want to review a specific CET ("NO" branch of block 504), flow progresses to block 506. In a scenario where there are more CETs not listed, ("YES" branch of block 506), user 101 is able to request privileges from TS 100 administration to view and/or use CETs restricted from the user's view at block 508. In a scenario where all the CETs have been listed ("NO" branch of block 506), user 101 is able to create a new CET at block 510.

Continuing on with the example of block 510, in a scenario where user 101 wants to create a CET ("YES" branch of block 510), flow progresses to block 210 (FIG. 2A) where user 101 is able to create a new template at block 244 (FIG. 2A). In a scenario where user 101 does not want to create a new CET ("NO" branch of block 510), flow progresses back to block 502 where user 101 is presented with the display of existing CETs.

Continuing on with the example of block 504, in a scenario where user 101 wants to review a specific CET ("YES" branch of block 504), flow progresses to block 512 where the specific CET is retrieved. User 101 is able to execute the specific CET ("YES" branch of block 514) and flow progresses to block 210 (FIG. 2A) where flow progresses to block 224 and specific CET is executed. In a scenario where user 101 wants to edit the specific CET ("NO" branch of block 514), flow progresses to block 516. User 101 is able to edit the specific CET ("YES" branch of block 516) and flow progresses to block 210 where user 101 is able to edit the specific CET at block 232. In a scenario where user 101 does not want to edit the specific CET ("NO" branch of block 516), flow progresses to block 518 where user 101 is able to enter new values or modify existing values. Flow progresses to block 514 where user 101 is able to execute the new values for the specific CET.

FIG. 6 is a flow diagram representation of a method of managing chaos individual experiments 600, in accordance with some embodiments.

In some embodiments, additional operations are performed before, during, and/or after method 600 depicted in FIG. 6, and that some other processes are only briefly described herein. Method 600 is implementable, for example, using computing system 1200 (FIG. 12, discussed below), in accordance with some embodiments.

In FIG. 6, method 600 includes blocks 602-618. At block 602, user 101 is presented with a display of existing CEs. Flow progresses to block 604 where user 101 is able to review a specific CE. In a scenario where user 101 does not want to review a specific CE ("NO" branch of block 604), flow progresses to block 606. In a scenario where there are more CEs not listed, ("YES" branch of block 606), user 101 is able to request privileges from TS 100 administration to view and/or use CEs restricted from the user's view at block 608. In a scenario where all the CEs have been listed ("NO" branch of block 606), user 101 is able to create a new CE at block 610.

Continuing on with the example of block 610, in a scenario where user 101 wants to create a new CE ("YES" branch of block 610), flow progresses to block 206 (FIG. 2A) where user 101 is able to create a new template at block 244 (FIG. 2A), select a recommended CE at block 212, select an existing template at block 210, or select an existing CEB at block 208. In a scenario where user 101 does not want to create a new CE ("NO" branch of block 610), flow progresses back to block 602 where user 101 is presented with a display of existing CEs.

Continuing on with the example of block 604, in a scenario where user 101 wants to review a specific CE ("YES" branch of block 604), flow progresses to block 612 where the specific CE is retrieved. User 101 is able to execute the specific CE ("YES" branch of block 614) and flow progresses to block 206 (FIG. 2A) where the specific CE is executed. In a scenario where user 101 wants to edit the specific CE ("NO" branch of block 614), flow progresses to block 616. User 101 is able to edit the specific CE ("YES" branch of block 616) and flow progresses to block 226 where user 101 is able to edit the specific CE at block 222. In a scenario where user 101 does not want to edit the specific CE ("NO" branch of block 616), flow progresses to block 618 where user 101 is able to enter new values or modify existing values. Flow progresses to block 614 where user 101 is able to execute the new values for the specific CET.

Figure 7:
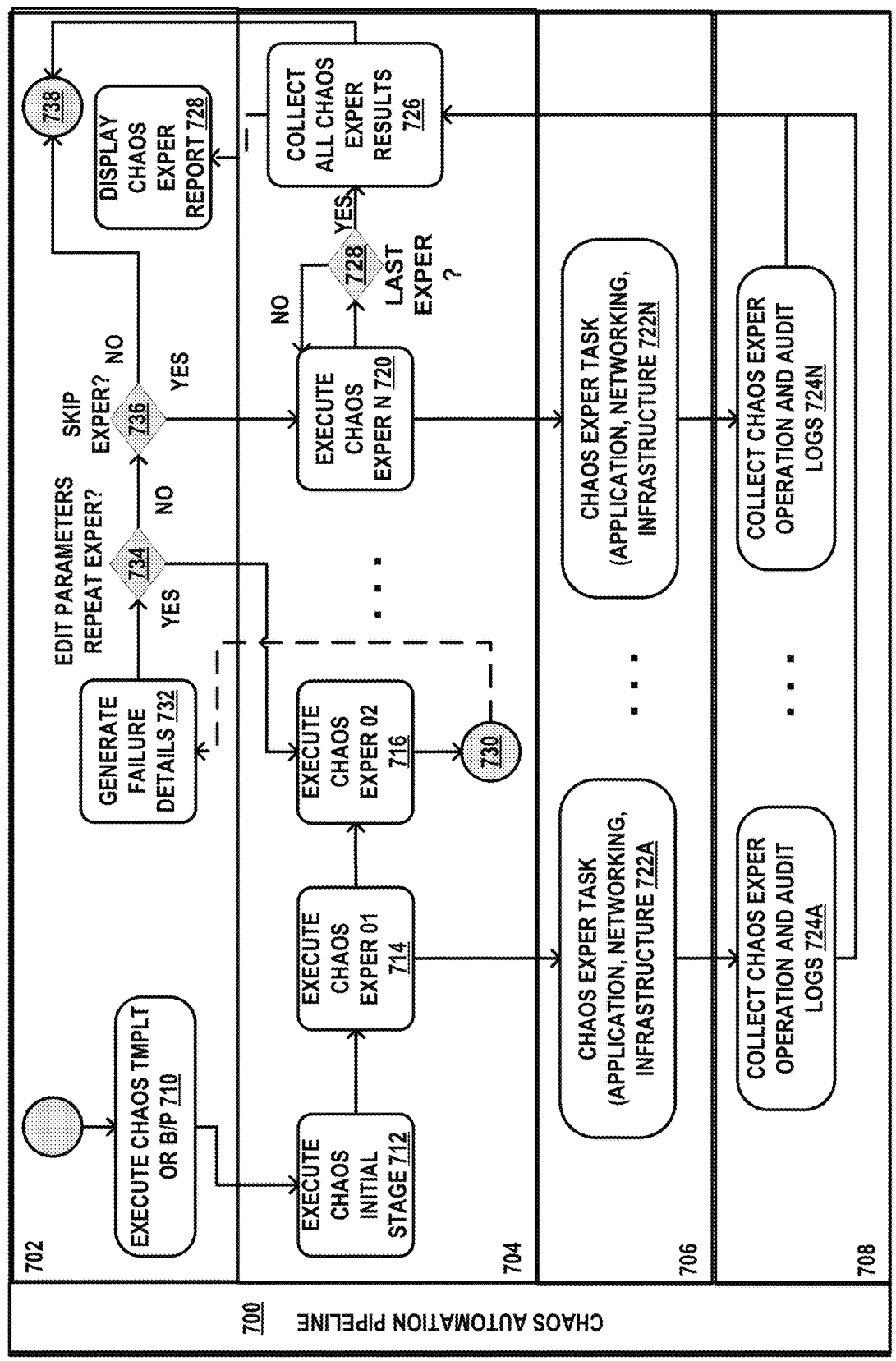
FIG. 7 is a modeling diagram representation of a chaos pipeline, in accordance with some embodiments.

FIG. 7 is a modeling diagram representation of a chaos pipeline 700, in accordance with some embodiments.

In some embodiments, FIG. 7 is a function model with a functional modeling perspective. Additionally or alternatively, the functional model of FIG. 7 concentrates on describing the dynamic processes occurring within chaos automation pipeline 700. In some embodiments, chaos automation pipeline 700 is a modeling perspective into the CAPO process, such as a function, transformation, activity, action, task etc.

In some embodiments, chaos automation pipeline (CAP) 700 details the processes of CAPO 104. Additionally or alternatively, CAP 700 shows interaction between user 702, chaos pipeline 704, chaos executor 706, and chaos reporter 708. In some embodiments, chaos reporter 708 is like executor module 124 in that chaos reporter 708 collects CE results, retrieves data from executed CEs, sends CE results to user 101, and designates CE identification (ID).

In some embodiments, upon user 702 electing to execute a CET or CEB 710, process flows to chaos pipeline 704 where an initial stage of a CE is performed 712. Process flows to block 714 where a first CE is executed. In some embodiments, after first CE is executed (block 714), a second CE is executed (block 716) and up to N CEs executed (block 720).

In some embodiments, once CE begins the execution process (e.g., blocks 712, 716 through 720) process flows to chaos executor 706 where each CE experiment task, from first CE (block 710) to N CE (block 720) is performed. Additionally or alternatively, each CE has a CE task (block 722A) through (block 722N), where the CE is simulated on an application, a network, and/or infrastructure.

In some embodiments, as each CE is being executed, CE operation data and audit logs are being collected in chaos reporter 708. Additionally or alternatively, each CE creates a separate operation log form first CE (block 724A) through N CE (block 724N).

In some embodiments, all operation and audit logs are collected in chaos pipeline 704 (block 726). Additionally or alternatively, chaos pipeline 704 determines whether all CEs have been executed at block 728. In a scenario where there are more CEs to execute, process flows back to block 720 to continue executing CEs. In a scenario where all the CEs have been executed, process flows to block 726 where all the CE results are collected from chaos reporter 708.

In some embodiments, the CE results are made available in the form of a report that is displayed for user 702, for example on UI 108 and/or dashboard 110 (block 728). Additionally or alternatively, in the event of a failure during any of the CEs, the CE stops execution (block 730) and failure details are generated for user 702 (block 732). In some embodiments, like discussed in method 400, user 702 decides whether to edit parameters of the CE and repeat the experiment (734). Additionally or alternatively, in a scenario where user 702 wishes to rerun the CE, parameters are edited and the CE is sent back to chaos pipeline 704 to be executed once again. In some embodiments, user 702 desires not to rerun the CE and instead skip the CE entirely (736).

In some embodiments, in a scenario where user 702 wishes to skip the experiment, process flow may return to chaos pipeline 704 and begin the next sequential CE. Additionally or alternatively, in a scenario where user 702 does not wish to skip the CE, the process exits and terminates at block 738.

Figure 8:
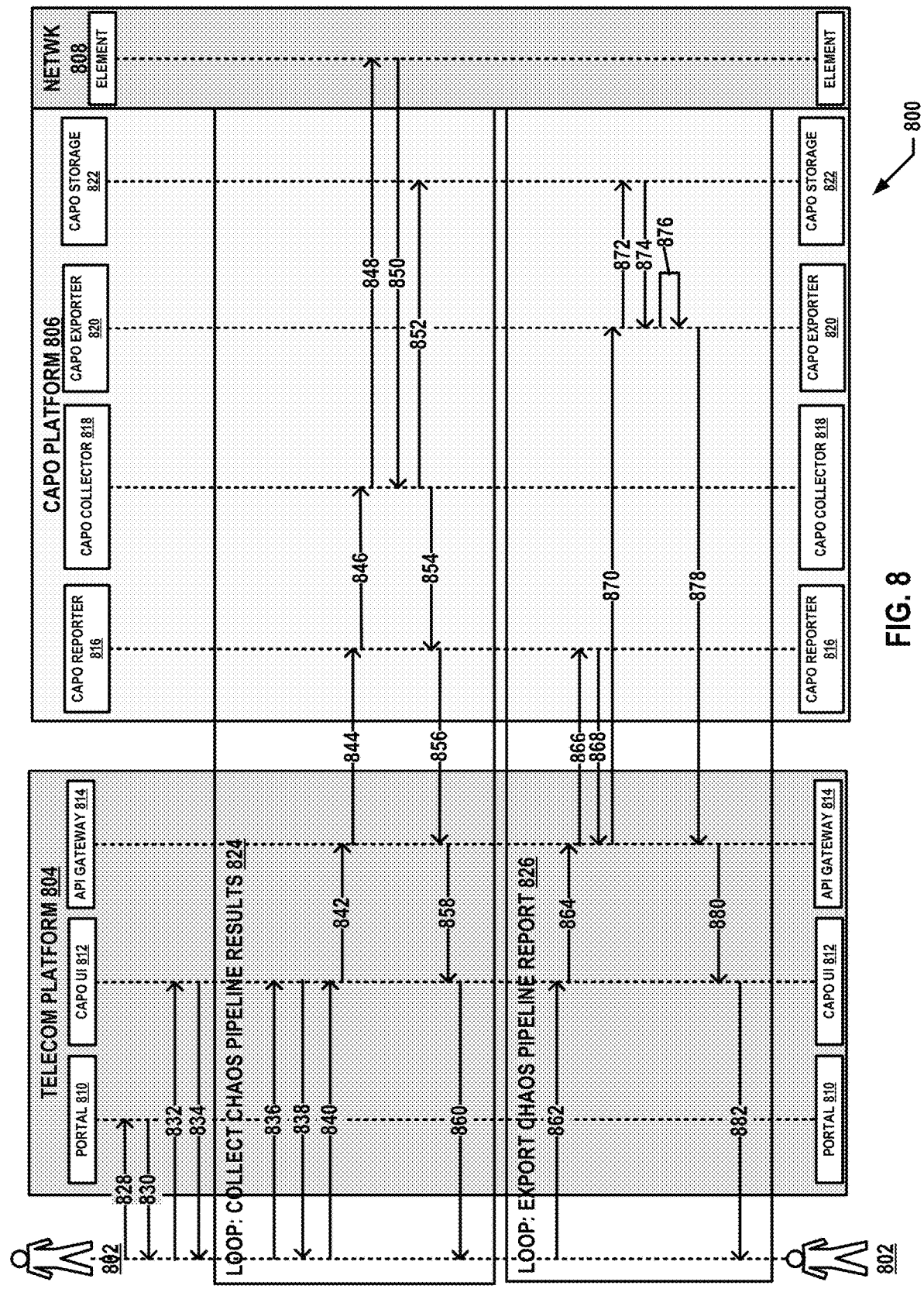
FIG. 8 is a call flow diagram representation of a chaos reporter, in accordance with some embodiments.

FIG. 8 is a call flow diagram representation of a chaos reporter 800, in accordance with some embodiments.

In some embodiments, chaos reporter 800 is like reporter module 124 in that controls call flow between user 802 and other modules.

In some embodiments, user 802, telecommunications platform 804, CAPO platform 806 and network 808 have interactions with one other through communications discussed in detail below. Additionally or alternatively, telecommunications platform 804 is like mobile device 102 in the fact both operate to interact with a user 101 or 802 and provide access to CAPO 104 and CAPO platform 806. In some embodiments, CAPO platform 806 is like CAPO 104 of FIG. 1.

In some embodiments, telecommunications platform 804 includes portal 810, CAPO UI 812, and API Gateway 814. Additionally or alternatively, portal 810 is like SSO 114 in that portal 810 acts to provide a secure log on for user 101. In some embodiments, CAPO UI 812 is like UI 108 of mobile device 102 in that CAPO UI 812 is an interface for user 802 to interact with CAPO platform 806. Additionally or alternatively, API gateway 814 is like API gateway 116 in that API gateway 814 acts as a management tool that allows interaction between user 802 and a collection of backend services at telecommunications platform 804.

In some embodiments, CAPO platform includes CAPO reporter 816, CAPO collector 818, CAPO exporter 820 and CAPO storage 822. Additionally or alternatively, CAPO reporter 816 is like reporter module 124 in that CAPO reporter 816 creates reports that are displayed on CAPO UI 812 as well as being stored for reference and use by CAPO platform 806 at a later date or for use in another experiment. Additionally or alternatively, CAPO reporter 816 controls call flow between user 802 and other modules. In some embodiments, CAPO reporter 816 collects CE results, retrieves data from executed CEs, sends CE results to user 802, and designates CE identification (ID).

In some embodiments, CAPO collector 818 is like collector module 128 in that CAPO collector 818 gathers all experiment data from executed CEs, fetches and stores CE logs, and stores operation and audit logs.

In some embodiments, CAPO exporter 820 is like exporter module 126 in that CAPO exporter 820 retrieves CE results, exports data in a desired format and confirms execution of the CE to user 802. Additionally or alternatively, CAPO storage 822 is like chaos knowledge DB 132 in that CAPO storage 822 stores operation and audit logs from CEs, retrieves CE results based on ID, and returns CE data when requested In some embodiments, chaos reporter 800 is split into two separate reports: a collect chaos pipeline results loop 824 and an export chaos pipeline report loop 826. Beginning with call 828, user 802 accesses portal 810. At call 830, portal 810 displays a CAPO module summary for user 802. User 802 then selects a CAPO module at CAPO UI 812 with call 832. CAPO UI 812 then returns a CAPO module dashboard with call 834.

In some embodiments, within collect chaos pipeline results 824, user 802 access chaos pipeline object at CAPO UI 812 with call 836. With call 838, CAPO UI 812 returns a chaos pipeline list for user 802. User 802 requests a CE pipeline report from CAPO UI 812 with call 840. CAPO UI 812 collects a CE pipeline report through API gateway 814 with call 842 and through to CAPO reporter 816 with call 844. CAPO reporter 816 retrieves data from executed CEs from CAPO collector 820 with call 846. CAPO collector 818 fetches and stores CE logs from network element 808 with call 848. Network element 808 sends CE operation and audit logs back to CAPO collector 818 with call 850. CAPO collector 820 stores the CE operation and audit logs on CAPO storage 822 with call 852. CAPO collector 818 sends CE operation and audit logs to CAPO reporter 816 with call 854. CAPO reporter 816 sends the CE pipeline results back through API gateway 814 with call 856 to CAPO UI 812 with call 858.

In some embodiments, within export chaos pipeline report 826, user 802 selects to export the chaos pipeline report at CAPO UI with call 862. CAPO UI 812 displays the pipeline results to user 802 with call 862. CAPO UI 812 sends a request with call 864 to collect the chaos pipeline report through API gateway 814. API gateway 814 requests a CE ID from CAPO reporter 816 with call 866. CAPO reporter returns a CE ID to API gateway 814 with call 868. API gateway 814, with call 870, retrieves CE results based on the ID from CAPO exporter 820. CAPO exporter 820 then retrieves CE results based on the CE ID from CAPO storage 822 with call 872. CAPO storage 822 returns CE data to CAPO exporter 820 with call 874. CAPO exporter 820 then exports the CE data in a selected format with call 876 and confirms execution of the task to API gateway 814 with call 878. The confirmation is forwarded through to CAPO UI 812 with call 880 and then onto user 802 with call 882.

FIG. 9 is a pictorial diagram representation of a display 900 showing chaos templates 904, in accordance with some embodiments.

In some embodiments, a user has an option to select an existing chaos template, such as existing template 902 shown in template display 900. Additionally or alternatively, a user selects, on display 900, an existing chaos template out of many templates 904. In some embodiments, each template 904 has a status indicator 906 (e.g, active, disabled, or draft), a name 908 given to template 904, an ID 910, a type 912 (e.g., audit, upgrade, trouble-shooting, VPN access, etc.), another type identifier 914 (e.g., standalone or workflow) and a chaos reporter ID 916.

Figure 10:
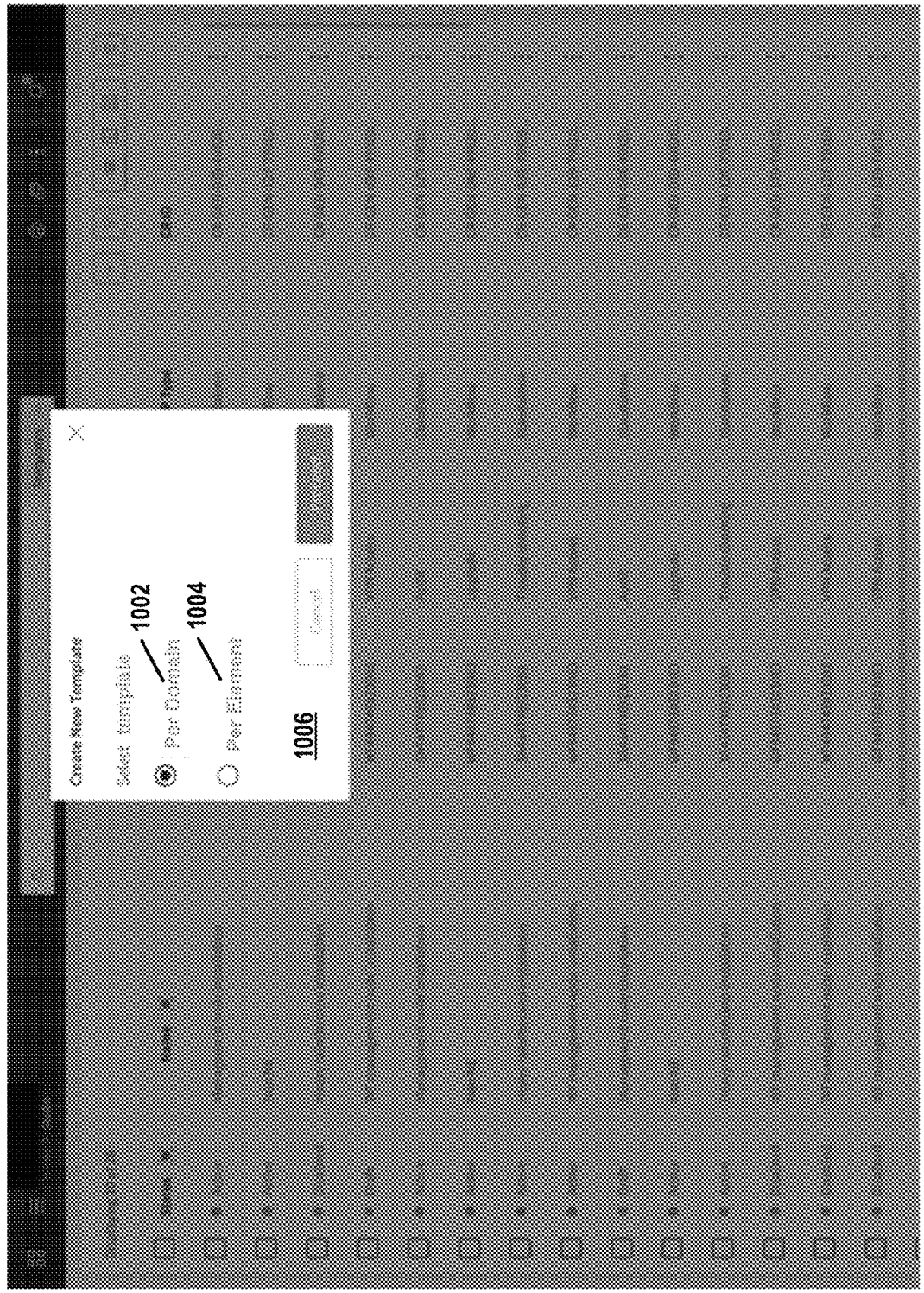
FIG. 10 is a pictorial diagram representation of a template display, in accordance with some embodiments.

FIG. 10 is a pictorial diagram representation of a template display 1000, in accordance with some embodiments.

In some embodiments, a user is able to, at display 1000, select and/or modify a target domain, by selecting domain option 1002, or basic or advanced parameters, by selecting option 1004 in new template box 1006. For example, the user selects to modify target domains by selecting domain option 1002 or the user selects to modify elements, such as basic or advanced parameters, by selecting element option 1004 on template display 1000.

FIG. 11 is a pictorial diagram representation of a chaos template creation display 1100, in accordance with some embodiments.

In some embodiments, a template is a basic model that each created CE derives. For example, template 1100. In some embodiments, the user chooses, on template display 1100 to enter basic information, at basic information block 1102, for the template and define chaos tests and thresholds. In some embodiments, the user sets notification preferences in block 1104. In some embodiments, execution privileges are set in block 1106. In some embodiments, certifications are set in block 1108.

FIG. 12 is a block diagram of computing system 1200 in accordance with some embodiments. In some embodiments, computing system 1200 is a general purpose computing device including a hardware processing circuitry 1202 and a non-transitory, computer-readable storage medium 1204. Storage medium 1204, amongst other things, is encoded with, i.e., stores, computer program code 1206, i.e., a set of executable instructions to cause processing circuitry 1202 to perform operations, such as those of methods 200, 300, 400, 500, and 600. Execution of instructions 1206 by hardware processing circuitry 1202 represents (at least in part) tools which implement a portion or all of the methods described herein in accordance with one or more embodiments (hereinafter, the noted processes and/or methods).

Processing circuitry 1202 is electrically coupled to a computer-readable storage medium 1204 via a bus 1208. Processing circuitry 1202 is also be electrically coupled to an I/O interface 1210 by bus 1208. A network interface 1212 is also electrically connected to processing circuitry 1202 via bus 1208. Network interface 1212 is connected to a network 1214, so that processing circuitry 1202 and computer-readable storage medium 1204 are capable of connecting to external elements via network 1214. Processing circuitry 1202 is configured to execute computer program code 1206 encoded in computer-readable storage medium 1204 in order to cause coverage hold computing system 1200 to be usable for performing a portion or all of the noted processes and/or methods. In one or more embodiments, processing circuitry 1202 is a central processing unit (CPU), a multi-processor, a distributed processing system, an application specific integrated circuit (ASIC), and/or a suitable processing unit.

In one or more embodiments, computer-readable storage medium 1204 is an electronic, magnetic, optical, electromagnetic, infrared, and/or a semiconductor system (or apparatus or device). For example, computer-readable storage medium 1204 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1204 includes a compact disk-read only memory (CD-ROM), a compact disk-read/write (CD-R/W), and/or a digital video disc (DVD).

In one or more embodiments, storage medium 1204 stores computer program code 1206 configured to cause computing system 1200 to be usable for performing a portion or all of the noted processes and/or methods. In one or more embodiments, storage medium 1204 also stores information, such as cell outage compensation algorithm which facilitates performing a portion or all of the noted processes and/or methods. In one or more embodiments, storage medium 1204 stores parameters 507.

Computing system 1200 includes I/O interface 1210. I/O interface 1210 is coupled to external circuitry. In one or more embodiments, I/O interface 1210 includes a keyboard, keypad, mouse, trackball, trackpad, touchscreen, and/or cursor direction keys for communicating information and commands to processing circuitry 1202.

Computing system 1200 is also include network interface 1212 coupled to processing circuitry 1202. Network interface 1212 allows computing system 1200 to communicate with network 1214, to which one or more other computer systems are connected. Network interface 1212 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more computing system 1200.

Computing system 1200 is configured to receive information through I/O interface 1210. The information received through I/O interface 1210 includes one or more of instructions, data, design rules, libraries of standard cells, and/or other parameters for processing by processing circuitry 1202. The information is transferred to processing circuitry 1202 via bus 1208. Computing system 1200 is configured to receive information related to a UI through I/O interface 1210. The information is stored in computer-readable medium 1204 as user interface (UI) 1216.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. In some embodiments, a method includes receiving, from a mobile device, a request in a telecommunications system to invoke operations from an automation platform executed by processing circuitry to perform one or more of: executing, by the processing circuitry, one or more existing simulated failure experiments for the telecommunications system; determining, by the processing circuitry, whether a simulated failure blueprint is configured for specific simulated failure cases exist on the automation platform; determining, by the processing circuitry, whether a simulated failure template is configured to accept a targeted telecommunications domain and failure parameters exist on the automation platform; or instructing the mobile device to display recommended simulated failure experiments with selectable telecommunications domains and selectable failure parameters. Other embodiments of this aspect include corresponding computer systems, apparatus, and computer programs recorded on one or more computer storage devices, each configured to perform the actions of the methods.

Implementations may include one or more of the following features. The method includes executing telecommunications, using a cloud native telecommunications system, for the mobile device. The method includes: instructing the mobile device to display ongoing simulated failure experiments. The method includes: instructing the mobile device to display one or more of a plurality of simulated failure blueprints, a plurality of simulated failure templates, or a plurality of existing simulated failure experiments. The method includes: instructing the mobile device to display one or more of a plurality of simulated failure blueprints, receiving from the mobile device a selected simulated failure blueprint, or receiving from the mobile device simulated failure parameters. The method includes: instructing the mobile device to display one or more of a plurality of simulated failure templates, receiving from the mobile device a selected simulated failure template, receiving from the mobile device a simulated failure domain, and receiving from the mobile device simulated failure parameters for the simulated failure domain. The method includes: filtering, by the processing circuitry, the recommended simulated failure experiments based upon a selected telecommunications domain; and instructing the mobile device to display the recommended simulated failure experiments that include the user-selected telecommunications domain. The method includes: accepting, from the mobile device, a selected simulated failure experiment. The method includes: creating, by the processing circuitry, a new simulated failure blueprint, includes: instructing the mobile device to display one or more of a plurality of simulated failure templates; receiving from the mobile device a selected simulated failure template; receiving from the mobile device a simulated failure domain; and receiving from the mobile device simulated failure parameters for the simulated failure domain. Implementations of the described techniques may include hardware, a method or process, or computer software on a computer-accessible medium.

In some embodiments, a method for experimenting a telecommunications system includes receiving from a mobile device a request from a user in the telecommunications system to invoke simulated failure experimenting from an automation platform executed by processing circuitry. The method also includes receiving from the mobile device a simulated failure experiment based on one or more of a telecommunications domain or system parameters. The method also includes executing, by the processing circuitry, the simulated failure experiment for the telecommunications system configured to test software in the telecommunications domain with the system parameters. Other embodiments of this aspect include corresponding computer systems, apparatus, and computer programs recorded on one or more computer storage devices, each configured to perform the actions of the methods.

Implementations may include one or more of the following features. The method includes: determining, by the processing circuitry, whether a simulated failure blueprint is configured for specific simulated failure cases exist on the automation platform. The method includes: determining, by the processing circuitry, whether a simulated failure template is configured to accept a targeted telecommunications domain and whether failure parameters exist on the automation platform. The method includes: instructing the mobile device to display recommended simulated failure experiments with selectable telecommunications domains and selectable failure parameters. The method includes executing telecommunications, using a cloud native telecommunications system, for the mobile device. The method includes: instructing the mobile device to display ongoing simulated failure experiments. Implementations of the described techniques may include hardware, a method or process, or computer software on a computer-accessible medium.

In some embodiments, a system includes processing circuitry, memory connected to the processing circuitry, where the memory is configured to store executable instructions that, when executed by the processing circuitry, facilitate performance of operations. The operations include: receiving from a mobile device in a telecommunications system an instruction to invoke simulated failure experimenting from an automation platform executed by processing circuitry; receiving from the mobile device a selected simulated failure experiment based on one or more of a telecommunications domain and system parameters; and executing, by the processing circuitry, the selected simulated failure experiment for the telecommunications system configured to test software in the telecommunications domain with the system parameters. Other embodiments of this aspect include corresponding computer systems, apparatus, and computer programs recorded on one or more computer storage devices, each configured to perform the actions of the methods.

Implementations may include one or more of the following features. The system where the mobile device usable for communicating in the telecommunications system. The telecommunications system is a cloud-native telecommunications system. The executable instructions facilitate performance of operations, includes: determining whether a simulated failure blueprint is configured for specific simulated failure cases exist on the automation platform. Implementations of the described techniques may include hardware, a method or process, or computer software on a computer-accessible medium.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method, comprising:
   receiving, from a mobile device, a request in a telecommunications system to invoke operations from an automation platform executed by processing circuitry to perform one or more of:
   executing, by the processing circuitry, one or more existing simulated failure experiments for the telecommunications system;
   determining, by the processing circuitry, whether a simulated failure blueprint is configured for specific simulated failure cases exist on the automation platform;
   determining, by the processing circuitry, whether a simulated failure template is configured to accept a targeted telecommunications domain and failure parameters exist on the automation platform; and
   instructing the mobile device to display recommended simulated failure experiments with selectable telecommunications domains and selectable failure parameters in response to a determination of a lack of the simulated failure blueprint and a determination of a lack of the simulated failure template.

2. The method of claim 1 further comprising executing telecommunications, using a cloud native telecommunications system, for the mobile device.

3. The method of claim 1 further comprising:
   instructing the mobile device to display ongoing simulated failure experiments.

4. The method of claim 1 further comprising:
   instructing the mobile device to display one or more of a plurality of simulated failure blueprints, a plurality of simulated failure templates, or a plurality of existing simulated failure experiments.

5. The method of claim 1 further comprising:
   instructing the mobile device to display one or more of a plurality of simulated failure blueprints;
   receiving from the mobile device a selected simulated failure blueprint; or
   receiving from the mobile device simulated failure parameters.

6. The method of claim 1 further comprising:
   instructing the mobile device to display one or more of a plurality of simulated failure templates;
   receiving from the mobile device a selected simulated failure template;
   receiving from the mobile device a simulated failure domain; and
   receiving from the mobile device simulated failure parameters for the simulated failure domain.

7. The method of claim 1 further comprising:
   filtering, by the processing circuitry, the recommended simulated failure experiments based upon a selected telecommunications domain; and
   instructing the mobile device to display the recommended simulated failure experiments that include the user-selected telecommunications domain.

8. The method of claim 7 further comprising: accepting, from the mobile device, a selected simulated failure experiment.

9. The method of claim 1 further comprising:
   creating, by the processing circuitry, a new simulated failure blueprint, comprising:
   instructing the mobile device to display one or more of a plurality of simulated failure templates;
   receiving from the mobile device a selected simulated failure template;
   receiving from the mobile device a simulated failure domain; and
   receiving from the mobile device simulated failure parameters for the simulated failure domain.

10. A method for experimenting a telecommunications system, comprising:
- receiving from a mobile device a request from a user in the telecommunications system to invoke simulated failure experimenting from an automation platform executed by processing circuitry;
- instructing the mobile device to display recommended simulated failure experiments with selectable telecommunications domains and selectable failure parameters;
- receiving from the mobile device a simulated failure experiment based on one or more of the telecommunications domains or the selectable failure parameters; and
- executing, by the processing circuitry, the simulated failure experiment for the telecommunications system configured to test software in the telecommunications domain with the selectable failure parameters.

11. The method of claim 10 further comprising:
- determining, by the processing circuitry, whether a simulated failure blueprint is configured for specific simulated failure cases exist on the automation platform.

12. The method of claim 10 further comprising:
- determining, by the processing circuitry, whether a simulated failure template is configured to accept a targeted telecommunications domain and whether failure parameters exist on the automation platform.

13. The method of claim 12 wherein:
- instructing the mobile device to display recommended simulated failure experiments with selectable telecommunications domains and selectable failure parameters is performed in response to a determination of a lack of the simulated failure template.

14. The method of claim 10 further comprising executing telecommunications, using a cloud native telecommunications system, for the mobile device.

15. The method of claim 10 further comprising:
- instructing the mobile device to display ongoing simulated failure experiments.

16. A system, comprising:
- processing circuitry; and
- memory connected to the processing circuitry, wherein the memory is configured to store executable instructions that, when executed by the processing circuitry, facilitate performance of operations, comprising:
  - receiving from a mobile device in a telecommunications system an instruction to invoke simulated failure experimenting from an automation platform executed by processing circuitry;
  - instructing the mobile device to display recommended simulated failure experiments with selectable telecommunications domains and selectable failure parameters;
  - receiving from the mobile device a selected simulated failure experiment based on one or more of the telecommunications domains and the selectable failure parameters; and
  - executing, by the processing circuitry, the selected simulated failure experiment for the telecommunications system configured to test software in the telecommunications domain with the selectable failure parameters.

17. The system of claim 16 wherein the mobile device usable for communicating in the telecommunications system.

18. The system of claim 16 wherein the telecommunications system is a cloud-native telecommunications system.

19. The system of claim 16 wherein the executable instructions facilitate performance of operations, comprising:
- determining whether a simulated failure blueprint is configured for specific simulated failure cases exist on the automation platform.

20. The system of claim 16 wherein the executable instructions facilitate performance of operations, comprising:
- determining whether a simulated failure template is configured to accept a targeted telecommunications domain and failure parameters exist on the automation platform.

* * * * *